US012756943B2

(12) United States Patent
Oza et al.

(10) Patent No.: US 12,756,943 B2
(45) Date of Patent: Oct. 6, 2026

(54) METHOD AND SYSTEM FOR COMPOUNDING VERIFICATION

(71) Applicant: Omnicell, Inc., Cranberry Township, PA (US)

(72) Inventors: Taral Oza, San Jose, CA (US); Michael Korthuis, Jackson, NH (US); Anhduc Nguyen, San Jose, CA (US); Jason Hwang, San Jose, CA (US); Hossain Alamin, Tacoma, WA (US); Nicolette Scerra, Kenmore, NY (US)

(73) Assignee: Omnicell, Inc., Cranberry Township, PA (US)

( * ) Notice: Subject to any disclaimer, the term of this patent is extended or adjusted under 35 U.S.C. 154(b) by 91 days.

(21) Appl. No.: 18/537,522

(22) Filed: Dec. 12, 2023

(65) Prior Publication Data

US 2025/0193534 A1 Jun. 12, 2025

(51) Int. Cl.

| | |
|---|---|
| ***H04N 23/90*** | (2023.01) |
| ***G06V 10/26*** | (2022.01) |
| ***G06V 10/75*** | (2022.01) |
| ***H04N 23/63*** | (2023.01) |

(52) U.S. Cl.

CPC ............. *H04N 23/90* (2023.01); *G06V 10/26* (2022.01); *G06V 10/751* (2022.01); *H04N 23/634* (2023.01); *H04N 23/635* (2023.01); *G06V 2201/034* (2022.01)

(58) Field of Classification Search

CPC .... H04N 23/90; H04N 23/634; H04N 23/635; G06V 10/26; G06V 10/751; G06V 2201/034

USPC .................................................... 348/207.99

See application file for complete search history.

(56) References Cited

U.S. PATENT DOCUMENTS 6,711,460 B1 * 3/2004 Reese .................... G16H 20/10 700/216
9,841,313 B2 * 12/2017 Izumo .................. G01G 23/002
2005/0243921 A1 * 11/2005 Au ....................... H04N 19/573 375/E7.262
2013/0204433 A1 * 8/2013 Gupta .................... G16H 20/10 700/239

(Continued)

OTHER PUBLICATIONS

Application No. PCT/US2024/058564 , International Search Report and Written Opinion, Mailed on Feb. 11, 2025, 12 pages. International Search Authority/US, Alexandria, Virginia US.

*Primary Examiner* — Usman A Khan
(74) *Attorney, Agent, or Firm* — Lee & Hayes, P.C.

(57) ABSTRACT

Systems and methods of compounding of medication include a user interface that enables efficient design of compounding workflows and protocols. The device may include a memory storing instructions that, when executed by a processor, perform operations including capturing an image of an object placed on the scale plate using the physical light camera; accessing a plurality of trained machine learning models stored in a memory of the pharmaceutical compounding device; determining an identification of the object based at least in part on the image of the object using machine learning image analysis techniques using a trained model using at least a first one of the plurality of trained machine learning models; determining a workflow based on the identification of the object; and generate a notification on the electronic display based on the workflow.

20 Claims, 23 Drawing Sheets

(56) References Cited

U.S. PATENT DOCUMENTS

| | | | | |
|---|---|---|---|---|
| 2016/0001003 | A1* | 1/2016 | Perazzo | A61M 5/1782 53/493 |
| 2017/0028130 | A1* | 2/2017 | Perazzo | B67B 3/2006 |
| 2019/0151545 | A1* | 5/2019 | Trovato | H04N 23/61 |
| 2019/0156697 | A1* | 5/2019 | Trovato | H04N 23/56 |
| 2019/0290796 | A1* | 9/2019 | Ma | G16H 40/20 |
| 2020/0179605 | A1* | 6/2020 | Trovato | H04N 23/57 |
| 2020/0349674 | A1* | 11/2020 | Ramanujam | G06N 5/025 |
| 2022/0262473 | A1 | 8/2022 | McCutchan et al. | |
| 2023/0032433 | A1* | 2/2023 | Lin | G06T 7/62 |
| 2023/0181826 | A1* | 6/2023 | Trovato | H04N 23/61 348/135 |
| 2024/0249428 | A1* | 7/2024 | Bachmann | G06V 30/224 |
| 2025/0248600 | A1* | 8/2025 | Singh | A61B 5/7267 |

* cited by examiner

METHOD AND SYSTEM FOR COMPOUNDING VERIFICATION

BACKGROUND OF THE INVENTION

Pharmaceutical compounding is the preparation of medications by the processing or combination of ingredients. Many medications, especially medications administered orally in pill form, are now manufactured in a variety of forms and dosages so that little preparation is needed at a pharmacy, other than placing the proper number of pills in a bottle to fill a doctor's prescription for a particular patient. However, medications for intravenous delivery are routinely compounded in hospital pharmacies or specialty clinics. Compounded medications may be patient-specific, or frequently used medications may be prepared and stocked for later use.

Typically, a physician will prescribe a particular medication or a combination of medications for a specific patient, for intravenous (IV) delivery. The pharmacy receives the prescription and prepares the IV solution with the proper amount of each prescribed medication. The compounded medication is then sent to the hospital floor for administration to the patient.

It is of utmost importance that the correct medications be prepared in the correct proportions, without the introduction of contaminants. Detailed protocols may be developed for the compounder to follow. The number of different protocols may be very large, because there may be a large number of different medications to choose from, in a variety of packages, to be prepared in a number of different ways, in a number of dosages, and to be provided in a number of different delivery vehicles. Further expiration dates on the medications must be checked.

Much of the work of compounding may be delegated to workers who are not registered pharmacists, or to robotic machines. Accordingly, meticulous records may be kept of the preparation of each medication, so that the pharmacist can review how each medication was compounded before it leaves the pharmacy. The records also enable review of the preparation of any particular medication at a later time, should there be any question of its correctness. At times, a pharmacy expert may introduce human error which causes the pharmacy compounding process to be inaccurate (e.g., a bag is cut-off, no syringe is present if removed too quickly, etc.).

Hospitals routinely track the number and type of consumable products used in the compounding process. This process can be tedious and subject to errors during times of high workload. A device that can identify the type and quantity of consumable products is highly desirable to reduce pharmacy workload and reduce errors.

Air bubbles in a syringe can pose several potential dangers, especially when administering medications or injections. Some of the main risks associated with air bubbles in syringes include embolism, inaccurate dosage, increased risk of infection, incomplete treatment, and pain and discomfort for the patient.

An automated method to detect air bubbles in syringes can minimize these risks. If air bubbles are detected, healthcare professionals are trained to remove air bubbles from syringes before administering injections. This process involves priming the syringe, flicking it gently to move air bubbles to the top, and then carefully pushing the plunger to expel the air. Ensuring proper techniques are used during medication administration can significantly reduce the likelihood of complications related to air bubbles in syringes.

BRIEF SUMMARY OF THE INVENTION

A pharmaceutical compounding device and machine learning techniques for compounding are disclosed. Various machine learning models can be trained to identify consumables using during the compounding process, determine proper placement of the consumables within a field of view of one or more cameras, and determine the presence of bubbles within a syringe. These machine learning techniques can reduce errors in the compounding process, accurately track use of consumables, and detect potentially hazardous situations from incorrect medications or air bubbles in syringes.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a pharmaceutical compounding device may include one or more processors. The pharmaceutical compounding device may in addition include a visible light camera. The pharmaceutical compounding device may also include an infrared camera. The pharmaceutical compounding device may further include a transparent tray that may include a scale plate. The pharmaceutical compounding device may in addition include an electronic display. The pharmaceutical compounding device may also include a memory storing instructions that, when executed by the processor, perform operations may include. The operations can include capturing an image of an object placed on the scale plate using the physical visible light camera. The operations can include accessing a plurality of trained machine learning models stored in a memory of the pharmaceutical compounding device. The operations can include determining an identification of the object based at least in part on the image of the object using machine learning image analysis techniques using a trained model using at least a first one of the plurality of trained machine learning models. The operations can include determining a workflow based on the identification of the object. The operations can include generating a notification on the electronic display based on the workflow. Other embodiments of this aspect include corresponding computer systems, apparatus, and computer programs recorded on one or more computer storage devices, each configured to perform the actions of the methods.

Implementations may include one or more of the following features. Pharmaceutical compounding device may include at least one of: a printer configured to print labels; a visible light source configured to illuminate the object on the scale plate, a barcode scanner, adjustable leveling knobs configured to level the pharmaceutical compounding device, a network interface, and an infrared area light source positioned below the transparent tray and configured to illuminate the object through the transparent tray. The operations may further include preprocessing the image of the object prior to determining an identification of the object. The preprocessing the image may include cropping the image. The operations may further include comparing the identification of the object to a plurality of consumable products expected for the workflow. When there is a mismatch between the identification of the object and the expected consumable products, the operations may include generating an alert to display on the electronic display. The operations may further include generating a count for a consumable product based on the identification and on the image with a second one of the plurality of trained machine learning models. The operations may further include storing the count in a memory of the pharmaceutical compounding device. The operations may further include determining that the object is an intravenous fluid bag. The operations may further include determining based at least in part on the image of the object using at least a third one of the plurality of trained machine learning models whether the object is within a field of view of the image. When the captured image of the object is determined as being at least partially outside the field of view, the operations may further include generate an alert to reposition the intravenous fluid bag on the scale plate and capture a second image of the object. When the captured image of the object is determined as being inside of the field of view, the operations may further include storing the image and continue the workflow. The operations may further include determining that the object is a syringe. The operations may further include capturing a second image of the object placed on the scale plate with an infrared camera. The operations may further include detecting a presence of an air bubble inside a fluid within the syringe based at least in part on the second image and using a fourth one of the plurality machine learning models. The operations may further include generating an alert that is displayed on the pharmaceutical compounding device when the presence of the air bubble is detected. The operations may further include determining that the object is a syringe. The operations may further include capturing a second image with of the object placed on the scale plate with an infrared camera. The operations may further include determining a volume of a fluid inside the syringe based at least in part on the second image and using a fourth one of the plurality of machine learning models. The operations may further include storing the determined volume of the fluid in a memory of the pharmaceutical compounding device. The operations may further include generating a notification for a user if the volume of the fluid is greater or less than a threshold amount of an expected volume of the fluid based on the workflow. Pharmaceutical compounding device may include a high precision weight scale underneath the scale plate. A measurement from the high precision weight scale can be fed into the machine learning model. Implementations of the described techniques may include hardware, a method or process, or a computer tangible medium.

In one general aspect, a method may include capturing an image of an object placed on a scale plate using a visible light camera. The method may in addition include accessing a plurality of trained machine learning models stored in a memory of the pharmaceutical compounding device. The method may also include determining an identification of the object based at least in part on the image of the object using machine learning techniques using at least a first one of the plurality of trained machine learning models. The method may further include determining a workflow based on the identification of the object. The method may in addition include generating a notification on an electronic display based on the workflow. Other embodiments of this aspect include corresponding computer systems, apparatus, and computer programs recorded on one or more computer storage devices, each configured to perform the actions of the methods.

Implementations may include one or more of the following features. The method may include comparing the identification of the object to a plurality of consumable products expected for the workflow. When there is a mismatch between the identification of the object and the expected consumable products, the method may include generating an alert to display on the electronic display. The method may include generating a count for a consumable product based on the identification and on the image with a second one of the plurality of trained machine learning models. The method may include storing the count in a memory of the pharmaceutical compounding device. The method may include determining that the object is an intravenous fluid bag. The method may include determining based at least in part on the image of the object using at least a third one of the plurality of trained machine learning models whether the object is within a field of view of the image. When the captured image of the object is determined as being at least partially outside the field of view. The method may include generate an alert to reposition the intravenous fluid bag on the scale plate and capture a second image of the object. When the captured image of the object is determined as being inside of the field of view, the method may include storing the image and continue the workflow. The method may include determining that the object is a syringe. The method may include capturing a second image with of the object placed on the scale plate with an infrared camera. The method may include detecting a presence of an air bubble inside a fluid within the syringe based at least in part on the second image and using a fourth one of the plurality machine learning models. The method may include generating an alert that is displayed on the pharmaceutical compounding device when the presence of the air bubble is detected. The method may include determining that the object is a syringe; capturing a second image with of the object placed on the scale plate with an infrared camera. The method may include determining a volume of a fluid inside the syringe based at least in part on the second image and using a fourth one of the plurality of machine learning models. The method may include storing the determined volume of the fluid in a memory of the pharmaceutical compounding device. The method may include generating a notification for a user if the volume of the fluid is greater or less than a threshold amount of an expected volume of the fluid based on the workflow. Implementations of the described techniques may include hardware, a method or process, or a computer tangible medium.

In one general aspect, non-transitory computer readable medium storing instructions to perform operations that may include capturing an image of an object placed on a scale plate using a visible light camera. The operations may include accessing a plurality of trained machine learning models stored in a memory of the pharmaceutical compounding device. The operations may include determining an identification of the object based at least in part on the image of the object using machine learning techniques using at least a first one of the plurality of trained machine learning models. The operations may include determining a workflow based on the identification of the object. The operations may include generating a notification on an electronic display based on the workflow. Other embodiments of this aspect include corresponding computer systems, apparatus, and computer programs recorded on one or more computer storage devices, each configured to perform the actions of the methods.

DETAILED DESCRIPTION OF THE INVENTION

Figure 1:
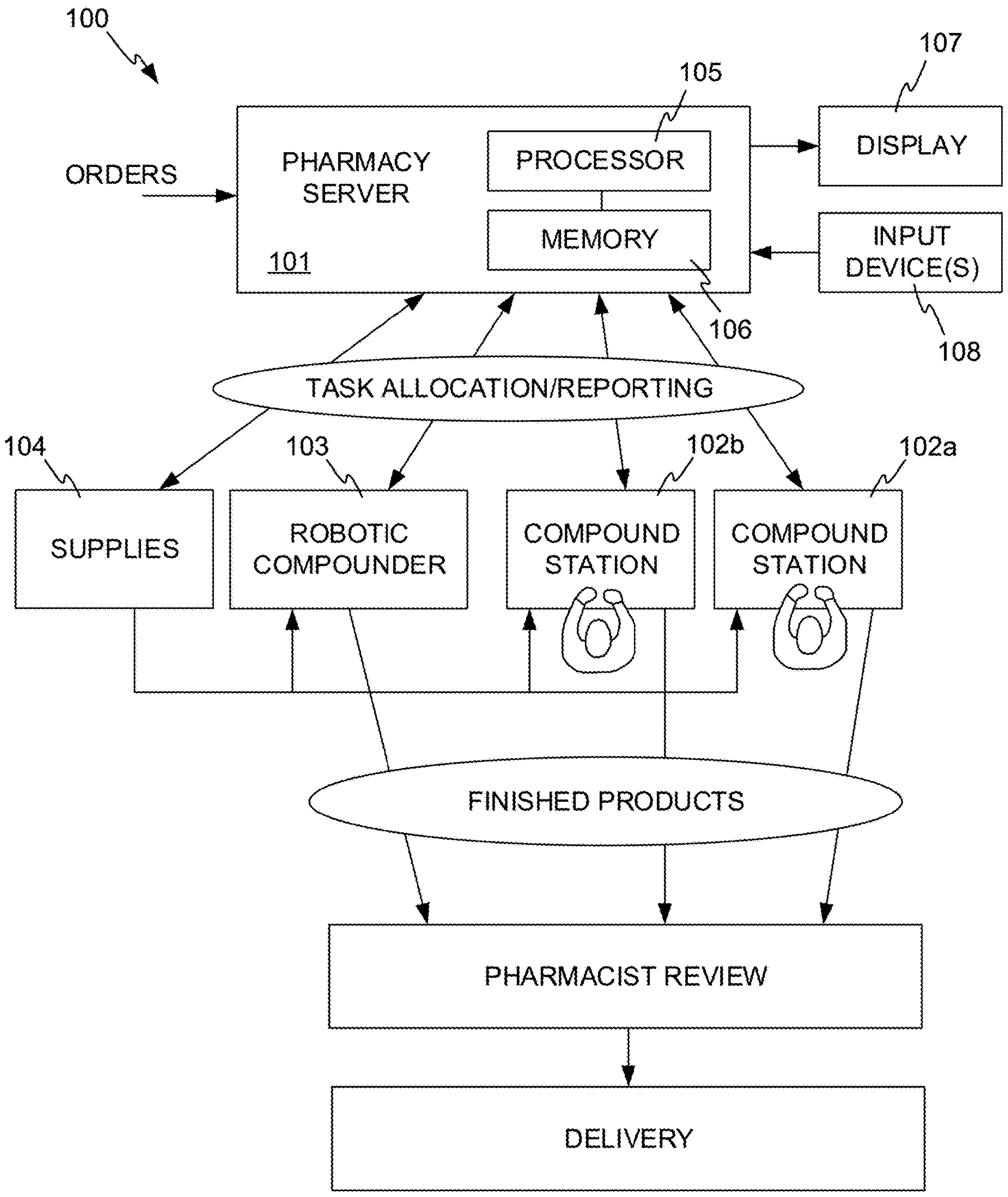
FIG. 1 illustrates a compounding pharmacy in accordance with embodiments of the invention.

FIG. 1 illustrates a compounding pharmacy 100 in accordance with embodiments of the invention. The operation of pharmacy 100 is coordinated by a pharmacy server 101, described in more detail below. Pharmacy server 101 receives orders for compounded medications, for example prescriptions from physicians. Pharmacy server 101 maintains extensive records of orders received, detailed protocols for the compounding of medications, records of the preparation of medications in response to orders, and other items. Pharmacy server 101 also allocates tasks to one or more compounding stations, which may include manual compounding stations such as stations 102*a* and 102*b*, and one or more robotic compounders 103. The compounding stations may also report information to pharmacy server 101, for example records of the compounding of each ordered medication.

Pharmacy server 101 includes a processor 105 and memory 106. Memory 106 holds instructions that, when executed by processor 105, cause pharmacy server to perform its functions in accordance with embodiments of the invention. Memory 106 may also hold the records, protocols, and other information collected and generated in the operation of pharmacy 100. For the purposes of this disclosure, the term "memory" encompasses many different kinds of data storage devices and combinations of such devices, for example dynamic memory, static memory, volatile memory, nonvolatile memory, and mass storage such as magnetic or optical disk storage or tape storage.

While pharmacy server 101 is shown as a single block in FIG. 1 and could be a single, stand-alone computer system having memory 106 and one or more processors 105, other implementations are possible. For example, pharmacy server may be implemented using a number of interconnected computers, either co-located or in multiple locations. In particular, pharmacy server 101 may be implemented as a "cloud" service, in which the functions of pharmacy server 101 may be performed by different processors at different times, and memory 106 may be distributed as well. Pharmacy server 101 presents information to a user via a user interface shown on an electronic display 107 (e.g., a touchscreen display) and may receive inputs from the user via any input device or devices 108, for example a keyboard, mouse, other pointing device, or other input devices or combinations of input devices.

Working materials are supplied to the compounding stations from a supply store 104. Pharmacy server 101 may maintain an inventory of the materials in supply store 104 and may track the movements of medications and supplies within pharmacy 100.

Finished products are reviewed by the pharmacist and delivered from pharmacy 100 to their points of use, for example patient rooms for administration by a nurse to a patient. It will be understood that the above description is highly generalized, and that a working compounding pharmacy may have many other systems and facilities.

Figure 2:
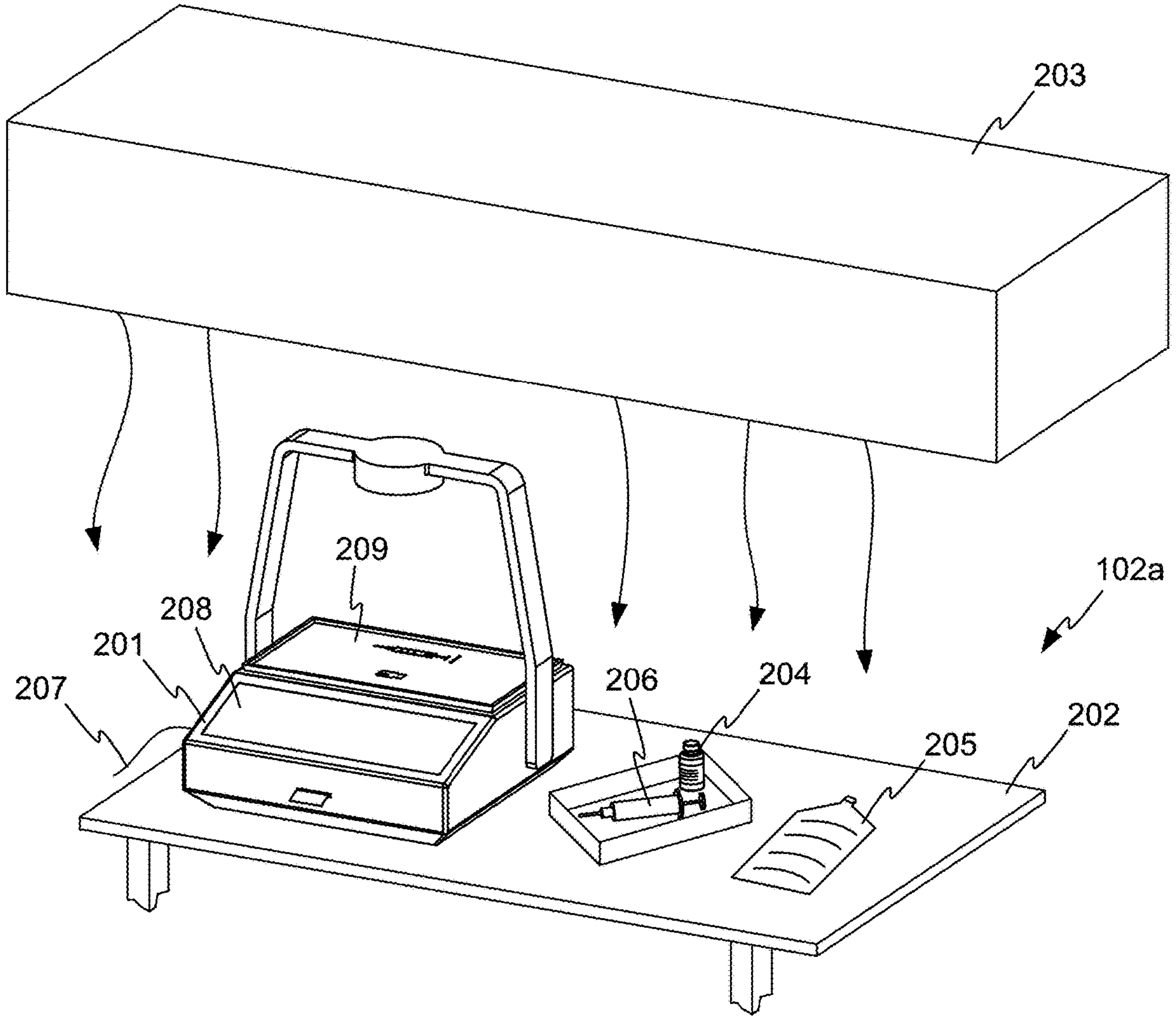
FIG. 2 illustrates a manual compounding station in accordance with embodiments of the invention.

FIG. 2 illustrates a manual compounding station 102*a* in accordance with embodiments of the invention. Compounding station 102*a* includes a compounding assistance device 201 on a surface 202. For the purposes of this disclosure, a compounding assistance device 201 is an electromechanical device having features and capabilities, examples of which are described below, for facilitating the performance of a compounding task by a human operator. Compounding assistance device 201 may be placed under a laminar flow hood 203, which flows filtered air over compounding assistance device 201 and surface 202, to help avoid contamination of the materials being worked on, and for protection of the user of compounding station 102*a*.

In the example shown, compounding station 102*a* has received supplies for a simple compounding task. A medication supplied in a vial 204 is to be added to an IV bag 205. A syringe 206 may be used to accomplish the transfer.

Compounding assistance device 201 has several features and capabilities that will assist the compounder in properly preparing the formulation in IV bag 205, and in thoroughly documenting the process. Compounding assistance device 201 has a network connection 207 to pharmacy server 101, though which compounding assistance device 201 may receive instructions from pharmacy server 101 describing the steps required to perform the compounding task.

For the purposes of this disclosure, a protocol is a list of ingredients and containers and a reference to the processing workflow to produce a specific IV medication. A workflow is a generic set of steps, specified independent of the particular medication and dosage of the specific compounding task. One workflow can describe the generic steps required for a kind of compounding task. Many different protocols may reference the workflow, for specific medications and amounts. For example, a particular workflow may describe the steps needed to draw medication from a vial 204 and add it to an IV bag 205. Multiple protocols can then reference that workflow for placing a specific dosage of a specific medication in the IV bag 205. This point will be explained further below.

Compounding assistance device 201 includes a display 208 on which instructions to the user may be presented or through which the user may input information. For example, display 208 may be a touchscreen display, sensitive to touch and able to distinguish the location of a touch. Compounding assistance device 201 also includes a tray 209 which provides a carrier for holding items while they are weighed or photographed, as is described in more detail below.

Figure 3:
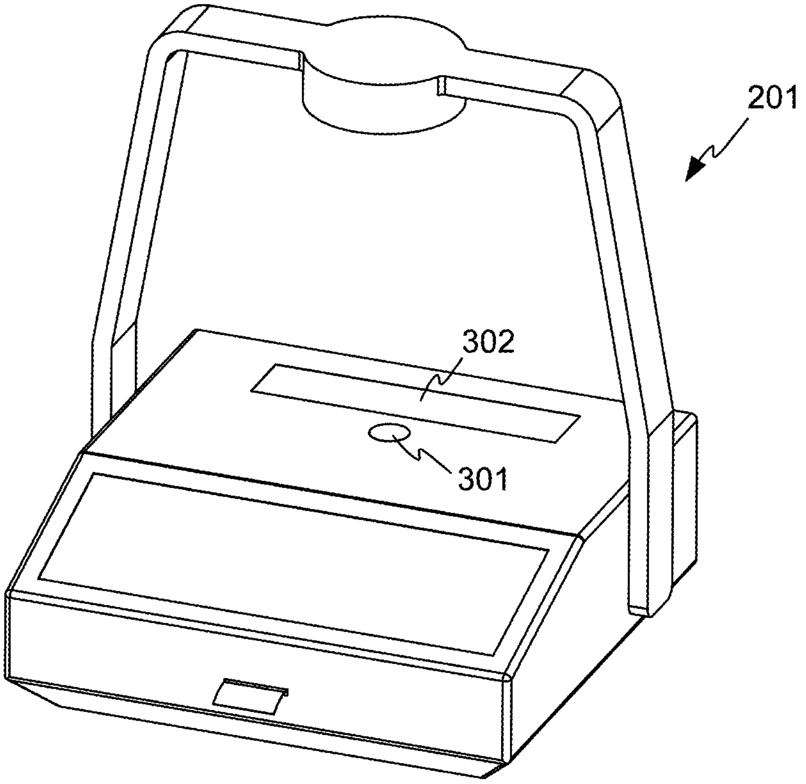
FIG. 3 shows a compounding assistance device, in accordance with embodiments of the invention.

FIG. 3 shows compounding assistance device 201, with tray 209 removed, in accordance with embodiments of the invention. Visible in FIG. 3 is a weight sensor 301, for example a load cell, for weighing tray 209 and its contents. Also visible is a light source 302. Light source 302 may be, for example, an infrared light panel, illuminating a portion of tray 209 from below with infrared light.

Figure 4:
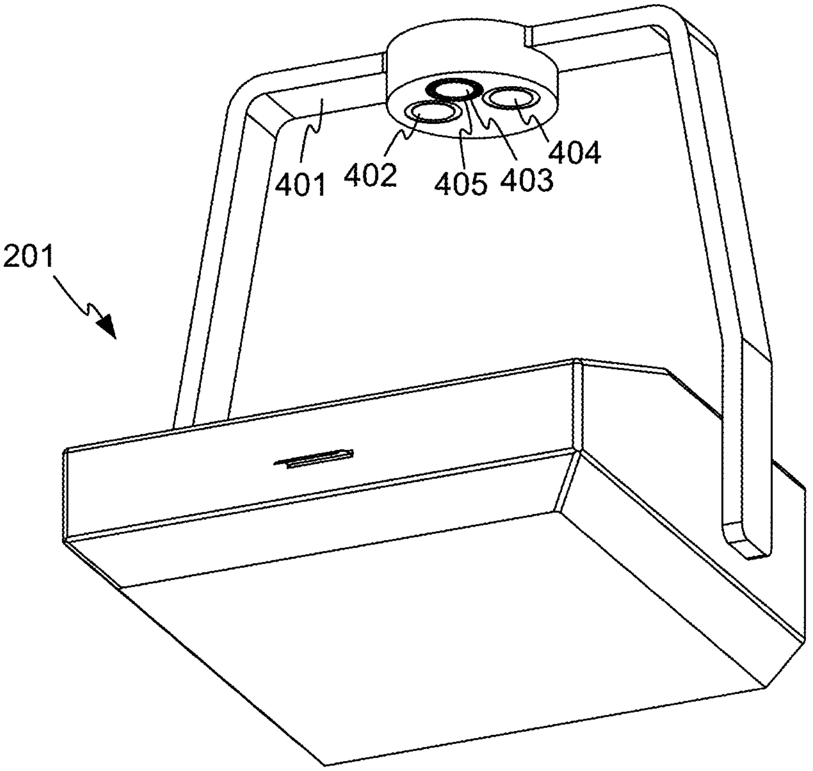
FIG. 4 shows a lower oblique view of the compounding assistance device of FIG. 3, in accordance with embodiments of the invention.

FIG. 4 shows a lower oblique view of compounding assistance device 201, in accordance with embodiments of the invention. A gantry 401 spans tray 209. Positioned on gantry 401 are a barcode scanner 402, a visible light camera 403, and an infrared camera 404. Visible light camera 403 may further include one or more light sources 405 for illuminating at least a portion of tray 209 from above. Light sources 405 may be, for example, one or more white-light light emitting diodes (LEDs) surrounding visible light camera 403, or another kind of light source. For the purposes of this disclosure, light is "visible" if it includes light wavelengths between about 400 and 700 nanometers. Light is "white" if it includes enough wavelengths in the visible range to enable reasonably complete color recognition.

The area above tray 209 may be called a viewing area for items to be photographed by infrared camera 404 or visible light camera 403 or scanned by barcode scanner 402. In other embodiments, an item may not necessarily be illuminated from below and photographed from above. For example, in a compounding robot, a robotic mechanism may hold an item to be photographed in the field of view of a camera in any orientation. For example, an item may be photographed from below, or horizontally.

Barcode scanner 402 is positioned to read barcodes on items held in the viewing area between tray 209 and barcode scanner 402. Visible light camera 403 and infrared camera 404 are position to take photographs of items on tray 209.

During compounding of a medication, one or more of weight sensor 301, barcode scanner 402, visible light camera 403, and infrared camera 404 can be used to provide documentation of how the medication was compounded, and to avoid errors.

For example, to perform the compounding task illustrated in FIG. 2, pharmacy server 101 transmits detailed sequential instructions to compounding assistance device 201, which then leads the user through the steps required to formulate the specific medication in the specific dose required, for delivery in the specific delivery vehicle. In this example, the task may involve transferring 30000 units of Heparin (a common anticoagulant) from a vial containing 5000 units/mL of Heparin in solution, to an IV bag 205. The volume of solution required for transfer is therefore 6 milliliters (mL). Vial 204 and IV bag 205 have been supplied to compounding station 102*a*, along with syringe 206, which will be needed to make the transfer.

Figure 5:
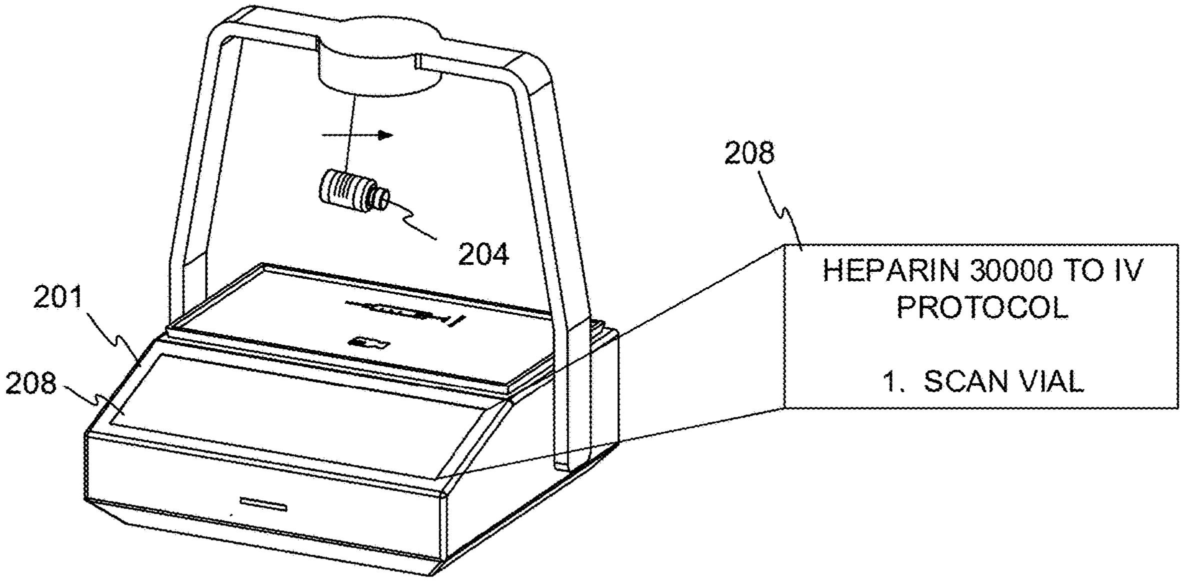
FIG. 5 illustrates barcode scanning by the compounding assistance device of FIG. 3, in accordance with embodiments of the invention.

First, compounding assistance device 201 requires that the user position a vial 204 to barcode scanner 402, so that the identifying barcode on vial 204 can be read, and the system can verify that the correct vial 204 with the correct ingredient and concentration has been provided. If not, then an error message can be generated and the compounding task is stopped. The scanning process is illustrated in FIG. 5, along with an example prompt shown on the display 208. Compounding assistance device 201 may automatically recognize that the barcode has been detected and may move to the next step. Alternatively, an acknowledgment from the user may be required, in this and other steps.

Figure 6:
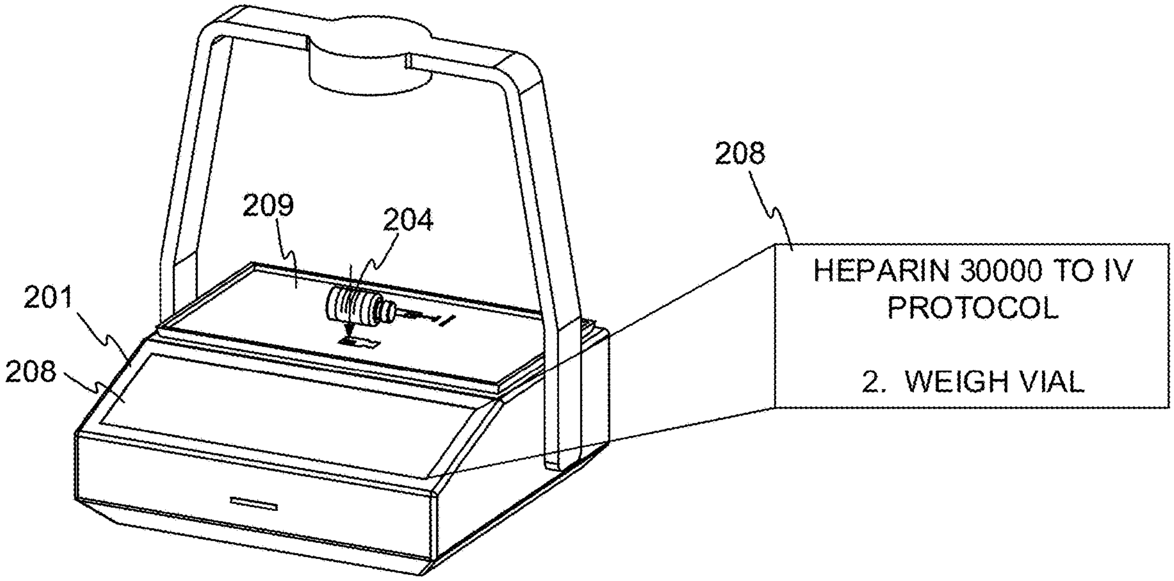
FIG. 6 illustrates a step in a compounding process, in accordance with embodiments of the invention.

FIG. 6 illustrates a second step in the compounding process, in which an initial weight of vial 204 is collected. For this purpose, vial 204 is placed on tray 209. Tray 209 may include an icon 601 indicating where vial 204 should be placed and may also include mechanical features for aiding in proper placement of vial 204. For example, a gently V-shaped trough may be formed into tray 209. Compounding assistance device 201 may automatically recognize the weight of vial 204 on tray 209, record the weight, and move to then next step of the compounding process.

In some embodiments, vial 204 may also be photographed while on tray 209 using visible light camera 403, using ambient light, light from light sources 405, or a combination thereof.

Figure 7:
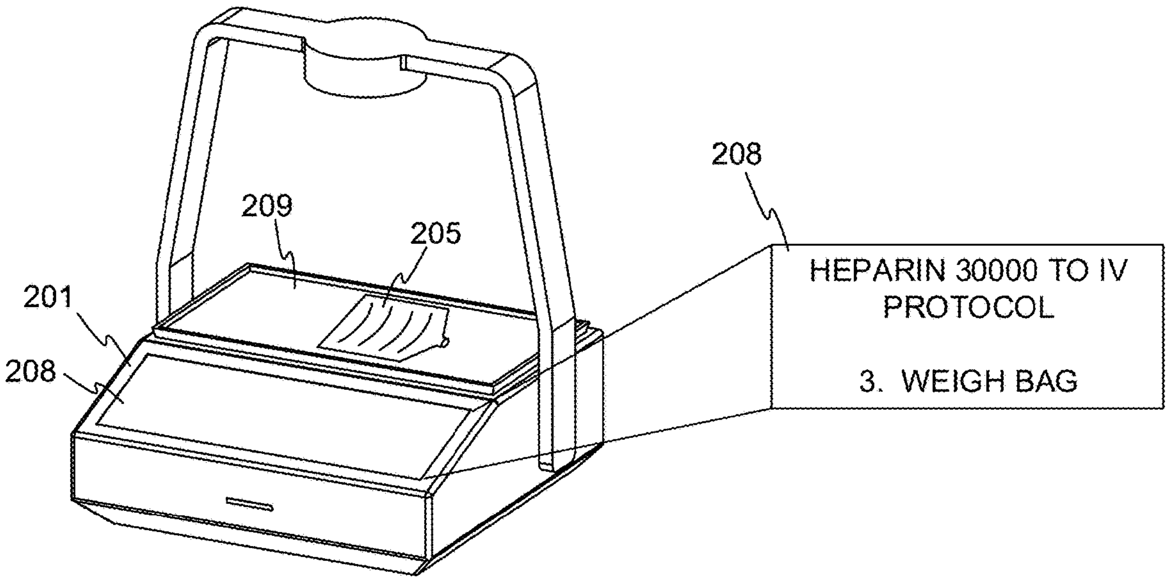
FIG. 7 illustrates another step in the compounding process, in accordance with embodiments of the invention.

FIG. 7 illustrates a third step, in which an initial weight of IV bag 205 is collected. The IV bag 205 can be placed on to the tray 209. A scale (e.g., a high precision scale) can measure the weight of the IV bag 205. The weight of the IV bag 205 can be stored in a memory. Compounding assistance device 201 may then prompt the user via the display 208 to draw the correct amount (6 ml) of solution from vial 204 into syringe 206.

Figure 8:
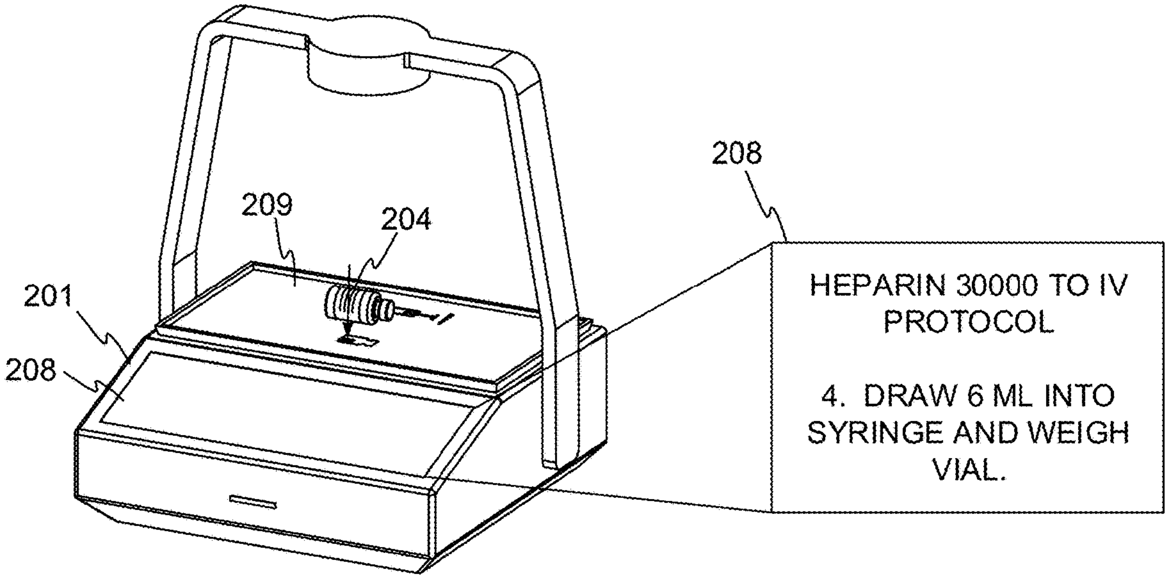
FIG. 8 illustrates another step in the compounding process, in accordance with embodiments of the invention.

FIG. 8 illustrates a fourth step, in which an after-drawn weight of vial 204 is taken, in a manner similar to the taking of the initial vial weight shown in FIG. 6. The system can compare the two weights of vial 204 to calculate the amount of solution drawn from vial 204, for recordkeeping and for verification that the proper amount of solution was drawn.

Figure 9:
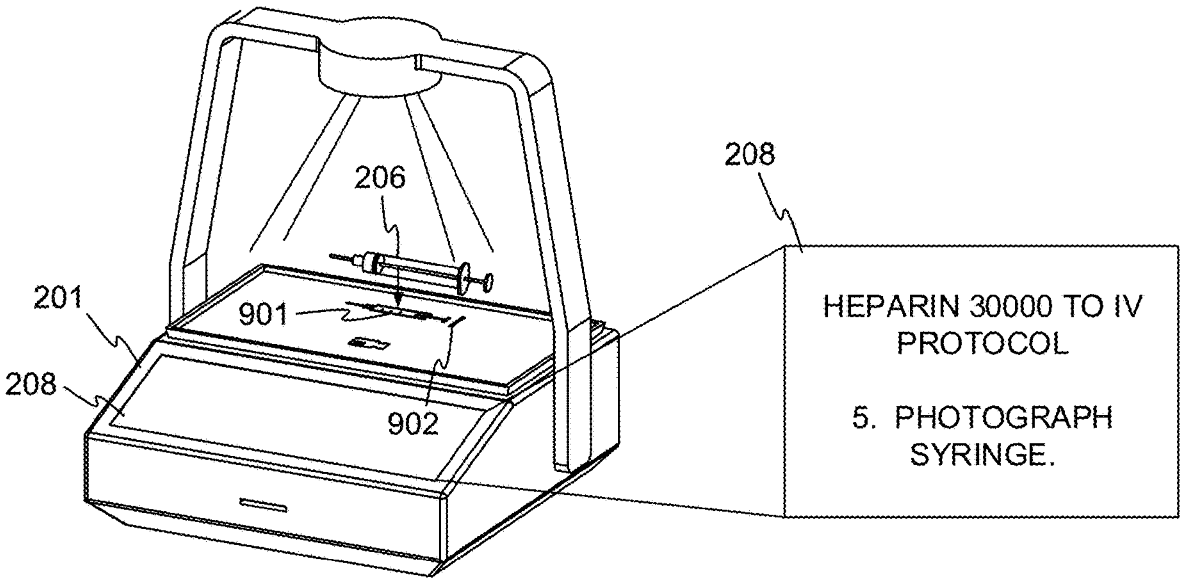
FIG. 9 illustrates another step in the compounding process, in accordance with embodiments of the invention.

FIG. 9 illustrates a fifth step, in which the filled syringe is photographed. For this purpose, tray 209 may include an icon 901 for placement of syringe 206 and may include mechanical features facilitating correct placement and alignment of syringe 206 on tray 209, for example a V-shaped trough, or a groove 902 shaped and sized to receive an edge of the barrel flange of syringe 206. Other fiducial marks may be present as well.

Figure 10:
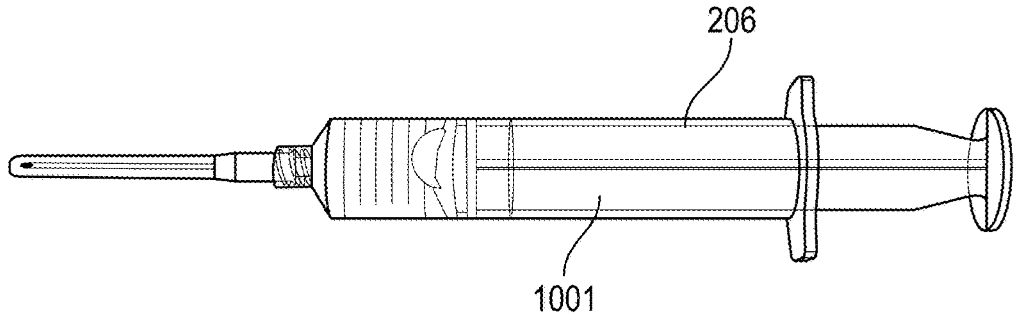
FIG. 10 shows a photograph as may be taken using a visible light camera, in accordance with embodiments of the invention.

Syringe 206 may be photographed using visible light camera 403 but can be preferably photographed using an infrared camera 404. FIG. 10 shows a photograph as may be taken using visible light camera 403. (Visible light camera 403 preferably has a field of view larger than shown in FIG. 10, but syringe 206 has been isolated from the larger view for ease of explanation.) While syringe 206 is readily visible in the photograph of FIG. 10, the photograph has been affected by glare spot 1001, and may have been affected by ambient light sources that are not under the control of compounding assistance device 201.

Figure 11:
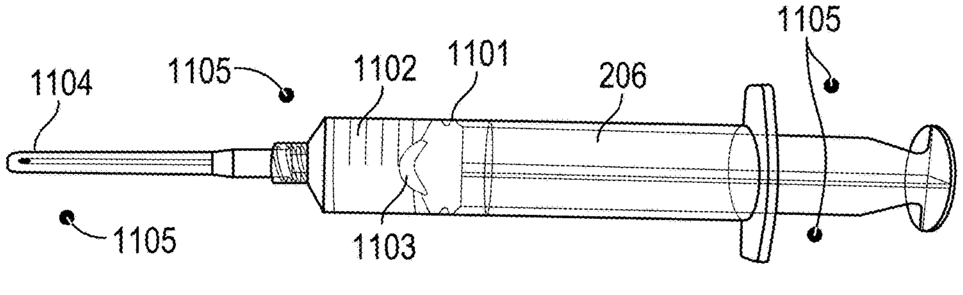
FIG. 11 shows a photograph of a syringe as may be taken using an infrared camera, in accordance with embodiments of the invention.

FIG. 11 shows a photograph of syringe 206 as may be taken using the infrared camera 404. Tray 209 is not opaque to infrared radiation, so syringe 206 is backlit by infrared light source 302. For example, tray 209 may be substantially transparent to infrared radiation, or may be translucent. In some embodiments, tray 209 may be made of polycarbonate or another suitable polymer or blend of polymers. Infrared camera 404 may have a wavelength-selective optical filter that passes infrared light to camera 404 but blocks the visible light spectrum. Thus, glare spots formed from visible light can be excluded from the photograph of FIG. 11, resulting in greater clarity of features of syringe 206.

Whichever kind of camera is used, the compounding assistance device 201 can automatically analyze the resulting photograph for any of a number of purposes. For example (referring to FIG. 11), the position of the plunger 1101 of syringe 206 may be automatically recognized, and the amount of drawn liquid 1102 calculated based on the known dimensions of syringe 206. In some embodiments, bubbles such as bubble 1103 may be detected and flagged if they are large enough to significantly affect the dose of medication being prepared. In some cases, the weight of syringe 206 before and after drawing liquid from vial 204 may be used to verify that the correct amount of liquid was placed into syringe 206. In that case, compounding assistance device 201 may also photograph syringe 206 at each weighing and analyze the photographs to detect whether syringe cap 1104 may have been mistakenly included in one weighing but not another. Fiducial marks 1105 on tray 209 are placed in known positions and may be detected in the photograph and used to calibrate distances in the photograph.

Figure 12:
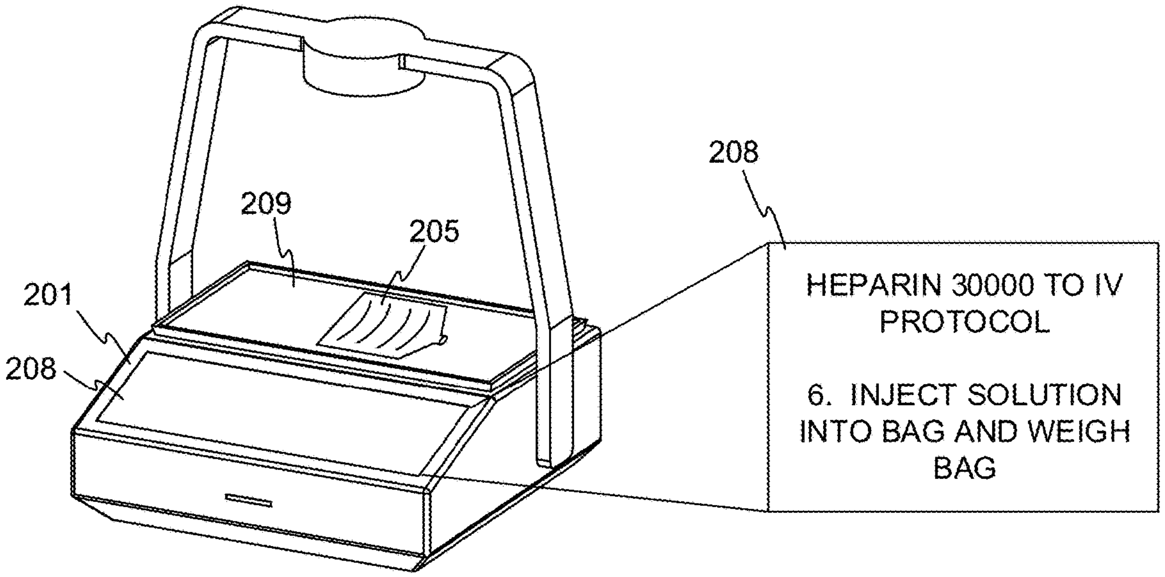
FIG. 12 illustrates another step in the compounding process, in accordance with embodiments of the invention.

FIG. 12 illustrates a sixth step, in which IV bag 205 is re-weighed after addition of solution from syringe 206. Compounding assistance device 201 can compare the before and after weights of IV bag 205 to verify that the correct amount of Heparin solution was placed into IV bag 205. An alert can be generated and displayed on the display 208 if there are any discrepancies.

Figure 13:
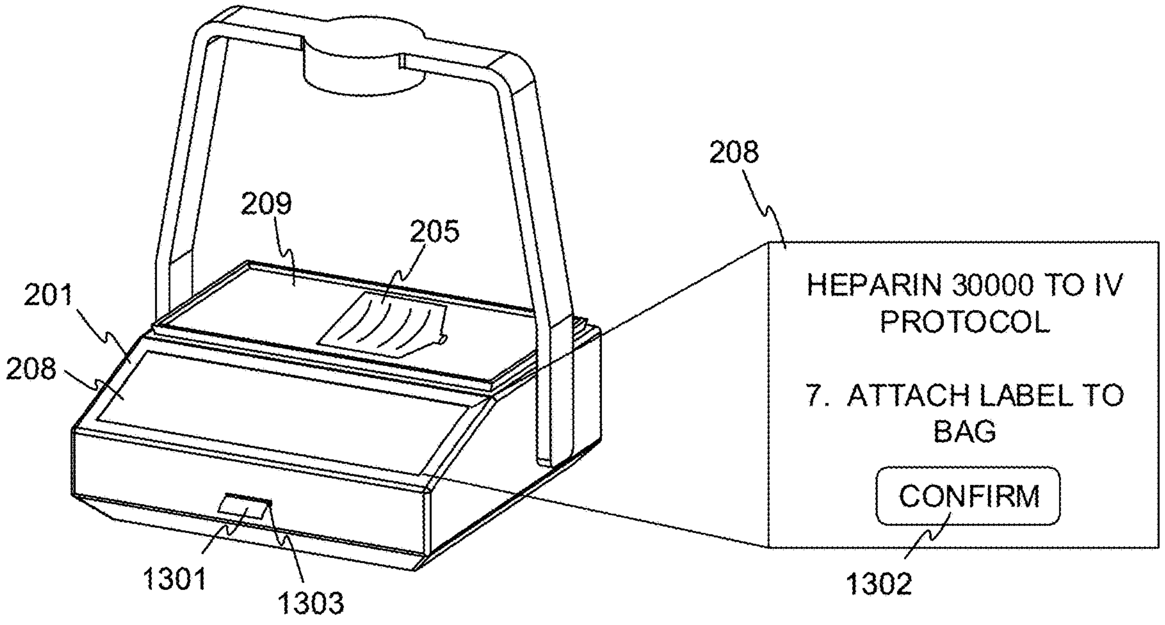
FIG. 13 illustrates another step in the compounding process, in accordance with embodiments of the invention.

FIG. 13 illustrates a seventh step, in which (presuming all of the checks in the system have verified that the compounding process was done correctly) the compounding assistance device 201 prints a label 1301 using label printer 1303, to be placed on the IV bag 205, and the user is prompted to adhere label 1301 to the IV bag 205. The finished medication can then be delivered to its point of use, and any consumable items disposed of, for example syringe 206. The user may be asked to confirm 1302 that label 1301 has been affixed, using the display 208. In some embodiments, a final photograph of completed IV bag 205 may be taken for pharmacist review.

The compounding process described above is but one example, and many different compounding workflows may be implemented that have different steps, which use different medication containers, which collect different or additional information for process verification, or that differ in other ways from the example shown.

While the above example was shown in the context of compounding workstation 102*a*, a similar process may be followed for compounding using a robotic compounder such as robotic compounder 103 shown in FIG. 1. A robotic compounder 103 can be a machine, usually enclosed, that uses a robotic mechanism to handle vials, syringes, bags, and the like to prepare compounded medications. A robotic compounder 103 may include a scale, one or more cameras, agitation devices, disposal ports, material and supply loading windows, and a delivery window for delivering a finished medication. Robotic compounders 103 are not subject to human error in the compounding process but include various weight and photographic checks on their work to guard against improper loading of materials, mechanical malfunctions, programming errors, and the like.

Whether compounding is done manually or robotically, the data collected during the compounding process can be stored in memory, for example on pharmacy server 101, and can be reviewed by the responsible pharmacist. For example, the pharmacist can verify that the correct kind of vial containing the correct medication was identified by the barcode scan. The dosage can be verified by looking at the photograph of the syringe, the before and after weights of the vial, the before and after weights of the bag, or any combination of these or other data. Any digital photographs taken during the compounding process may be made available for inspection by the pharmacist. For example, the pharmacist may look at a photograph such as the photograph of FIG. 11 to determine whether excessive bubbles may have been included in the liquid drawn into syringe 206.

Upon completion of the compounding task, pharmacy server 101 may assign another compounding task to compounding station 102*a* and download another protocol to compounding assistance device 201 in accordance with the new task.

With some of the steps of FIGS. 5-13 expanded, a workflow describing the above example may be listed as:

1. scan barcode of vial containing pharmaceutical;
2. place vial containing pharmaceutical on tray;
3. weigh vial containing pharmaceutical;
4. place bag containing diluent on tray;
5. weigh bag containing diluent;
6. draw pharmaceutical solution into syringe;
7. place vial containing remaining pharmaceutical on tray;
8. re-weigh vial containing remaining pharmaceutical;
9. place filled syringe containing pharmaceutical on tray;
10. photograph filled syringe containing pharmaceutical;
11. inject pharmaceutical from syringe into bag containing diluent;
12. place bag on tray;
13. weigh bag; and
14. affix label to completed bag.

This workflow is specific to placing a pharmaceutical from a vial into an IV bag 205 containing a diluent using a syringe 206 and using the weight of the vial 204 and a photograph of the syringe 206 as checks on the process. However, the workflow is generic as to the particular drug being transferred, the dosage, the diluent in the IV bag 205, and the sizes of the vial 204 and syringe 206 used. For example, the same workflow may be used to dispense a different dosage of Heparin into an IV bag 205 containing a different diluent using a different size of syringe 206, or to dispense a different drug into an IV bag 205 using the same size of syringe 206. Each of the different drugs, dosages, diluents, and container sizes would follow a different protocol implemented using the same workflow.

For example, the protocol corresponding to the above example may specify that Heparin is to be dispensed, in an IV bag 205 containing Dextrose 5% in water (D5W) as a diluent. The workflow can be applied to the protocol and viewed as follows:

1. scan barcode of vial containing Heparin;
2. place vial containing Heparin on tray;
3. weigh vial containing Heparin;
4. place bag containing D5W on tray;
5. weigh bag containing D5W;
6. draw Heparin into syringe;
7. place vial containing remaining Heparin on tray;
8. re-weigh vial containing remaining Heparin;
9. place filled syringe containing Heparin on tray;
10. photograph filled syringe containing Heparin;
11. inject Heparin from syringe into bag containing D5W;
12. place bag on tray;
13. weigh bag; and
14. affix label to completed bag.

Within this protocol, the instructions from pharmacy server 101 to compounding assistance device 201 may include information such as the specific gravity of the 5000 units/mL Heparin solution in the vial 204, so that the pharmaceutical compounding assistance device 201 can calculate the volume of solution drawn from the vial 204 and placed in the IV bag 205 based on the before and after weights of the vial 204 and the IV bag 205.

It will also be recognized that the example compounding task above could be accomplished using a different workflow. For example, rather than using a photograph of the syringe 206 to verify that the correct amount of solution was drawn into the syringe 206, a different workflow could use before and after weights of the syringe 206 for this purpose. In highly critical situations, a workflow could be designed that does both photographic and weight checks. For example, multiple checks may be used in the dispensing of a controlled substance where detection of diversion is especially important, or in pediatric practice where dose accuracy is especially important.

Other workflows may lay out the generic steps for reconstituting and compounding medications received in powdered form, for medications to be delivered in a syringe 206 for direct injection, or for other scenarios. More complex workflows may be designed for compounding multiple medications, for example placing multiple medications in a single IV drip bag 205.

For each workflow, a number of protocols may use the workflow with particular medications in particular doses. Previously, the preparation of compounding instructions was a laborious task, and was started anew for every medication, dosage, and delivery combination. In accordance with embodiments of the invention, the system facilitates the preparation of protocols and workflows, and in accordance with different delivery containers, verification techniques, and other parameters.

Figure 14:
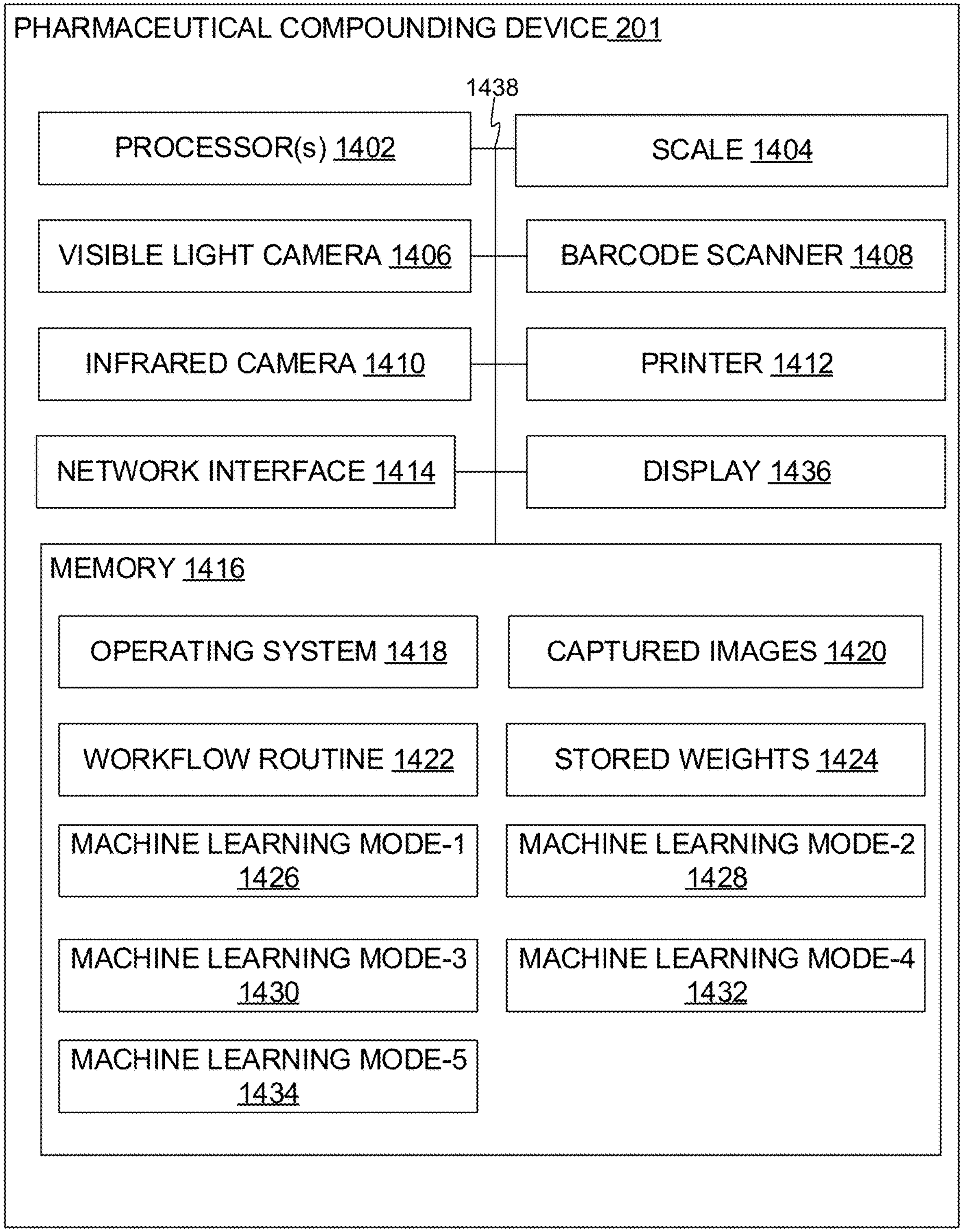
FIG. 14 illustrates a block diagram of a pharmaceutical compounding device in accordance with embodiments of the disclosure.

FIG. 14 illustrates a block diagram of a pharmaceutical compounding assistance device 201 in accordance with embodiments of the disclosure. The pharmaceutical compounding assistance device 201 can include one or more components connected via bus 1402. The one or more component can include one or more processors 105, a memory 106, a weight sensor 301, a visible light camera 403, a barcode scanner 402, an infrared camera 404, a printer 1303, a network interface 1404, a display 208, and a light 405.

The memory 106 can store data and one or more sets of instructions that can be executed by the one or more processors 105 to perform one or more operations. The one or more sets of instructions can include but are not limited to an operating system 1418, a workflow routine 1422, and various machine learning modules (e.g., machine learning module-1 1426, machine learning module-2 1428, machine learning module-3 1430, machine learning module-4 1432, and machine learning module-5 1434. The memory 106 can also store captured images 1420 and stored weights 1424.

The operating system 1418 is a software program that acts as an intermediary between computer hardware and the applications or software programs running on it. The operating system 1418 can manage and controls the various hardware components of a computer or electronic device and provides a user-friendly interface for users and applications to interact with the hardware.

The operating system 1418 can manage the computer's hardware resources, including the central processing unit (CPU), memory, storage devices (hard drives, SSDs), input/output devices (keyboard, mouse, monitor), and networking components. The operating system 1418 can handle processes, which are instances of running programs. It allocates CPU time to different processes, manages their execution, and ensures fair resource distribution among them. The operating system 1418 can control the computer's memory, allocating space for programs and data. It tracks which parts of memory are in use and which are free, facilitating efficient memory utilization. The operating system 1418 can provides a hierarchical structure for organizing and storing files and directories on storage devices. It manages file creation, deletion, reading, and writing operations. The operating system 1418 can handle interactions with various hardware devices, such as printers, scanners, and external drives. The operating system 1418 can provide standardized interfaces for applications to communicate with these devices. The operating system 1418 can ensure the security and privacy of data by implementing access controls, user authentication, and user-level permissions for files and resources. For most modern operating systems, the user interface can include graphical user interfaces (GUIs) that provide windows, icons, menus, and pointers (WIMP), as well as command-line interfaces (CLIs) where users interact with the system using text-based commands. In systems connected to networks, the operating system (OS) facilitates network communication, allowing devices to send and receive data over local area networks (LANs) or the internet. The operating system 1418 can monitor system operations and handles errors that may occur, such as software crashes, hardware failures, or resource conflicts. The operating system 1418 can optimize the allocation of resources like CPU time and memory to ensure efficient multitasking and responsive system performance. Different types of devices, such as personal computers, smartphones, servers, embedded systems, and more, may have specialized operating systems tailored to their unique requirements.

Some exemplary operating systems 1418 can include but are not limited to Windows, macOS, Linux, Chrome OS, Real Time Operating System (RTOS), embedded operating system, and FreeBSD. Linux can refer to a family of open-source operating systems used on a wide range of devices, from servers and desktops to embedded systems. Popular distributions include Ubuntu, Fedora, and CentOS. Real-Time Operating System can include operating systems designed for embedded systems and real-time applications, often found in devices like industrial machines, medical devices, and automotive systems. Examples can include QNX. Embedded Operating Systems can include light-weight operating systems designed for specific embedded devices, such as routers, smart home devices, and IoT devices. Examples include OpenWrt and FreeRTOS. Free-BSD can include a Unix-like operating system used for servers, workstations, and embedded systems.

A machine learning model (e.g., an image classifier) can be designed to categorize or label images into different classes or categories. The first step is to gather a dataset of images that are labeled with their corresponding categories. For instance, if the image classifier to distinguish between syringes 206 and vials 204, the image classifier would need a dataset of images of syringes labeled as "syringes" and images of vials labeled as "vial." These images could come from various sources such as online repositories, databases, or custom data collection. Once the data set is identified, the machine learning model can preprocess the images. Preprocessing the images may involve resizing the images to a consistent size, normalizing pixel values, and converting them into a suitable format for feeding into the model.

Images are essentially collection of pixels, and directly using pixel values as features can be extremely high-dimensional and computationally expensive. To extract meaningful features from images, techniques like Convolutional Neural Networks (CNNs) are commonly employed. CNNs are designed to automatically learn hierarchical patterns and features from images. CNNs consist of layers like convolutional layers, pooling layers, and fully connected layers.

In various embodiments, the following parameters can be configurable for each model: filter size for each layer, convolution activation, dense activation, dense units, dropout ratio, final dense activation, optimizer, learning rate, pool size, strides, and loss type.

In the context of a machine learning model, a "layer type" refers to a specific component or building block that makes up the architecture of the model. Machine learning models, especially neural networks, are composed of layers that process and transform data as it flows through the network. Each layer type has a specific function and characteristics that contribute to the model's ability to learn from data.

An input layer is the initial layer that takes in the raw input data. For example, in an image classification task, the input layer would receive the pixel values of the image.

In a dense (fully connected) layer each neuron is connected to every neuron in the previous layer. These layers are responsible for learning complex patterns in the data and are often used for the final classification or regression output.

Convolutional Layer: CNNs use convolutional layers to automatically learn spatial hierarchies of features from images. These layers are particularly effective for image analysis tasks.

In the context of machine learning, particularly in CNNs, the "filter size" can refers to the dimensions of the convolutional kernel or filter that is applied to the input data during the convolution operation. Convolutional layers are a fundamental component of CNNs and are used to extract features from input data, such as images. The filter size determines the receptive field of the convolutional operation, which is essentially the region of the input data that the filter "looks at" when computing a single value in the output (feature) map.

The filter size can be specified as a tuple of numbers (height, width), where Height is the number of rows in the filter and Width is the number of columns in the filter. For example, a common filter size might be (3, 3), meaning the filter has a height of 3 and a width of 3. During the convolution operation, this filter is slid over the input data (such as an image) in both vertical and horizontal directions, and at each position, the element-wise multiplication between the filter and the overlapping region of the input is computed. The resulting values are summed up to produce a single value in the output feature map.

Larger filter sizes can capture more complex patterns and features but might also lead to more parameters and increased computational cost. Smaller filter sizes capture simpler features and can help with detecting fine-grained details.

Filters are learned through the training process. In the initial stages of training, the filters are usually random or initialized with small values, and the training process adjusts their values to learn relevant patterns from the input data. Filter size is just one of the hyperparameters that can be adjusted when designing a convolutional neural network. Other hyperparameters include the number of filters in a layer, the stride (how much the filter shifts between computations), and the padding (adding extra rows and columns to the input to control the size of the output). The choice of these hyperparameters can significantly impact the model's ability to learn and generalize from the data.

In a machine learning model, particularly in the context of convolutional neural networks (CNNs), "strides" can refer to the step size at which a filter or kernel moves across the input data when performing the convolution operation. The stride determines how much the filter shifts between consecutive computations, affecting the spatial dimensions of the output feature map.

When a filter is convolved over the input data (e.g., an image), the filter's position shifts by a certain number of rows and columns with each step. This step size is the stride. The larger the stride, the fewer computations are performed, resulting in a smaller output feature map with reduced spatial dimensions. Conversely, a smaller stride leads to more computations and a larger output feature map.

The stride can be specified as a tuple of numbers (vertical stride, horizontal stride), where Vertical Stride is the number of rows the filter moves vertically with each step and Horizontal Stride is the number of columns the filter moves horizontally with each step.

For example, if you have an input image with dimensions 5×5 and you apply a 3×3 filter with a stride of (2, 2), the filter will move two rows and two columns at a time. This results in a smaller output feature map with dimensions 2×2.

Strides play a role in controlling the spatial resolution of the output feature map. Larger strides reduce the spatial dimensions more quickly, resulting in a loss of fine-grained information, while smaller strides preserve more detail but can lead to increased computational complexity.

Strides are just one of the hyperparameters that can be adjusted when designing a convolutional neural network. Other hyperparameters include filter size, number of filters in a layer, and padding (adding extra rows and columns to the input to control the size of the output). The choice of these hyperparameters depends on the nature of the task, the characteristics of the data, and the desired balance between computational efficiency and feature preservation.

In the context of a machine learning model, especially neural networks, "activation parameters" can refer to the parameters associated with activation functions within the network's layers. Activation functions introduce non-linearity to the network, allowing it to model complex relationships in the data. The activation parameters control how the activation function transforms the input data.

In each layer of a neural network, after performing a linear transformation (usually a dot product followed by a bias addition), an activation function can be applied elementwise to the result. This activation function introduces non-linearity and enables the network to capture complex patterns and relationships.

Activation functions often have parameters that control their behavior. For example, in the case of the rectified linear unit (ReLU) activation function, the parameter would be the threshold below which the function outputs zero. The sigmoid and hyperbolic tangent (tan h) activation functions have parameters that control the slope and shift of the curve.

For ReLU: f(x)=max (0, x), where the parameter is 0 (the threshold).

For Sigmoid: f(x)=1/(1+exp (−x)), where there are no specific parameters.

For Tan h: f(x)=(exp(x)−exp(−x))/(exp(x)+exp(−x)), where there are no specific parameters.

In many cases, the activation function's parameters are learned during the training process. This means that, as the model is trained on data, it adjusts these parameters along with other parameters (like weights and biases) to minimize the difference between the predicted output and the actual target values.

The choice of activation function and its parameters can significantly impact the model's training process and performance. Different activation functions have different properties, and the specific activation function used depends on the task and the characteristics of the data.

Pooling layers can be used in CNNs to reduce the spatial dimensions of the data, helping to extract and preserve important information while reducing computational complexity.

Recurrent Neural Networks (RNNs) can use recurrent layers to capture sequential information in the data. RNNs can be suitable for tasks involving sequences, such as natural language processing or time series analysis.

A Long Short-Term Memory (LSTM) Layer can be a specialized type of recurrent layer designed to mitigate the vanishing gradient problem and better capture long-range dependencies in sequences.

A Gated Recurrent Unit (GRU) Layer can be similar to LSTM layers, but GRU layers are designed to capture long-range dependencies in sequences, but they have a simpler architecture with fewer parameters.

Normalization Layers can be Batch Normalization or Layer Normalization and are used to improve the training stability and convergence of neural networks by normalizing the input data for each mini batch.

A dropout layer can be used as a regularization technique where neurons are randomly dropped out during training, preventing the network from relying too heavily on specific neurons and thus improving generalization.

An Output Layer can be the final layer of the network, responsible for producing the model's prediction. The architecture of this layer depends on the task, such as a SoftMax layer for classification or a linear layer for regression. The "output shape" of a machine learning model refers to the dimensions and structure of the predictions or outputs that the model produces after processing input data. The output shape can describe the format and layout of the data that the model generates as its final result.

Following generic structure represents configurable architecture for all five methods included in this disclosure can include the following layers as shown in Table 1:

TABLE 1

| Layer (type) | Output shape | Configurable Parameters |
|---|---|---|
| conv2d (Conv2D) | (None, 512, 512, 64) | filter size, activation |
| conv2d_1 (Conv2D) | (None, 512, 512, 64) | filter size, activation |
| max_pooling2d (MaxPooling2D) | (None, 256, 256, 64) | pool size, strides |
| conv2d_2 (Conv2D) | (None, 256, 256, 128) | filter size, activation |
| conv2d_3 (Conv2D) | (None, 256, 256, 128) | filter size, activation |
| max_pooling2d_1 (MaxPooling) | (None, 128, 128, 128) | pool size, strides |

In various embodiments additional groups of Convolutional layers and max pooling layers can be added. This count may vary for each of the machine learning models.

In various embodiments additional dropout layers with customized dropout ratio for each. Dropout layers may not be required for all five methods.

A dropout layer can be a regularization technique used in machine learning, particularly in neural networks, to prevent overfitting and improve the generalization capability of the model. Overfitting occurs when a model learns to perform extremely well on the training data but fails to generalize to new, unseen data. Dropout is designed to mitigate this problem by reducing the reliance of the network on any specific neuron during training.

In a dropout layer, during each training iteration, a random fraction of neurons in the layer are "dropped out," meaning they are temporarily ignored or deactivated. This dropout is typically implemented by setting the output of the dropped neurons to zero and scaling the remaining neurons' outputs to maintain the expected sum of activations.

During training, at each iteration or mini batch, a dropout probability is chosen. This probability determines the fraction of neurons to drop out. For each neuron in the dropout layer, a random decision is made based on the dropout probability. If the neuron is selected for dropout, its output is set to zero; otherwise, it remains unchanged. The outputs of the remaining neurons are scaled by a factor to account for the dropped neurons. This scaling helps maintain the expected magnitudes of activations.

During the testing or inference phase, no dropout is applied. The neurons' outputs are used as-is. Dropout effectively prevents the model from becoming too reliant on specific neurons or feature combinations, which helps in learning more robust features that generalize well to unseen data. It acts as a form of ensemble learning, as each mini batch sees a different "thinned" version of the network, reducing the likelihood of overfitting.

Dropout is one of the regularization techniques that can be applied alongside others, such as weight decay or early stopping.

The additional drop out layers are provided in Table 2 below:

TABLE 2

| Layer (type) | Output shape | Configurable Parameters |
|---|---|---|
| dense (Dense) | (None, 4096) | dense units, dense activation |
| dense_1 (Dense) | (None, 4096) | dense units, dense activation |
| dense_2 (Dense) | (None, output neurons) | final dense units, dense activation |

Next the model can be trained. Training can involve optimizing the model's parameters based on the labeled images in the dataset. During training, the model tries to minimize the difference between its predicted outputs and the true labels. This can be typically achieved by using a loss function, such as categorical cross-entropy for multi-class classification problems.

Model training uses different images and dataset for each of the five methods covered in this disclosure. The model training also uses images from real-life compounding pharmacy preparations. Images can be grouped manually into separate datasets, one for each method. Model training also uses configurable parameters such as steps per epoch, validation steps, epochs, During the training of each model, monitor the accuracy of overall model and adjust the configurable parameters as needed.

As new data (images) are available, the specific model for a given method needs to be re-trained. Each model's configurable parameters may have to be adjusted with respect to new dataset.

The optimization process uses an optimization algorithm like stochastic gradient descent (SGD) to adjust the model's weights and biases. The model can iteratively update its parameters by calculating gradients of the loss function with respect to these parameters and adjusting them in the direction that reduces the loss.

To prevent overfitting (when the model becomes too specific to the training data and does not generalize well to new data), a separate validation dataset is used. The model's performance on this dataset is monitored during training. Hyperparameters, such as learning rate, number of layers, and layer sizes, might be adjusted to find the best configuration that minimizes overfitting and maximizes performance.

Once the model is trained and its hyperparameters are tuned, the model can be evaluated on a separate test dataset that it has never seen before. This provides a realistic assessment of the model's performance on new, unseen data. Common evaluation metrics include accuracy, precision, recall, F1-score, and confusion matrix.

After successful training and evaluation, the model can be ready for inference. Given a new, unlabeled image, the trained model predicts the class to which the image belongs. This involves passing the image through the pre-trained model, extracting features using the learned convolutional layers, and making a final prediction using the fully connected layers.

Overall, an image classifier learns to recognize patterns and features in images through training on labeled data and subsequently uses this knowledge to classify new, unseen images.

Figure 15:
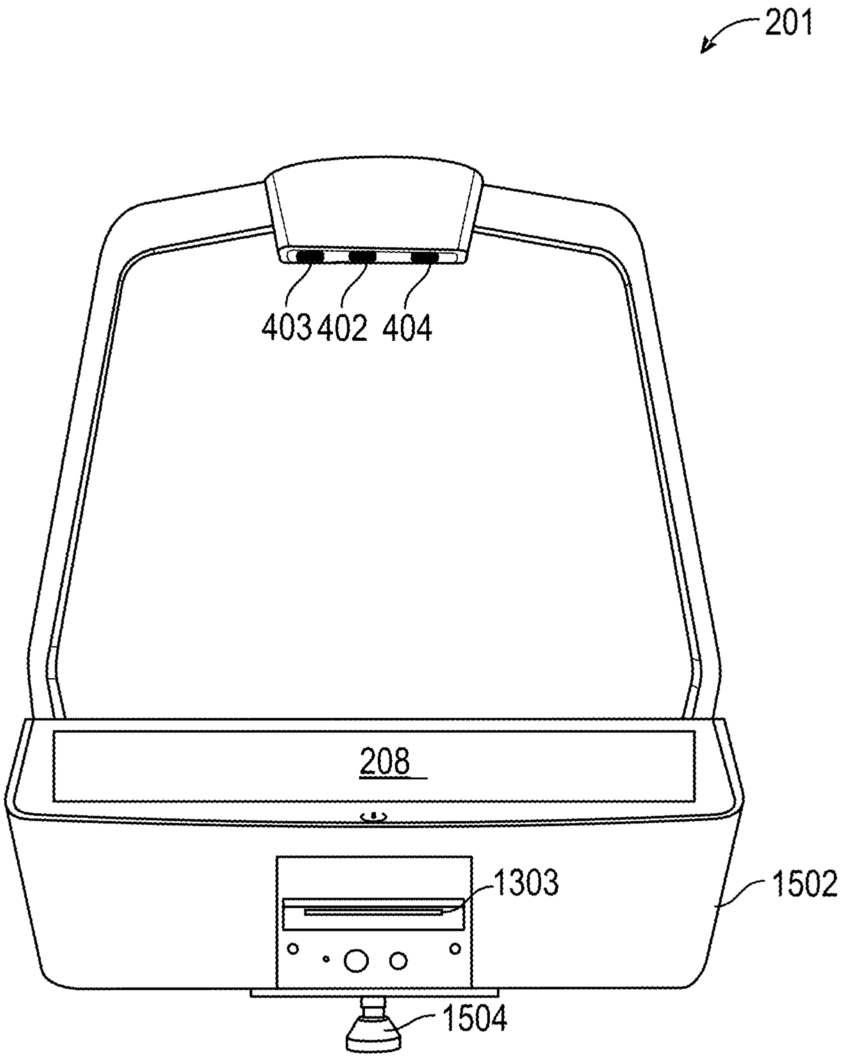
FIG. 15 illustrates a front view of a compounding assistance device.

FIG. 15 illustrates a front view of a compounding assistance device 201. The compounding assistance device 201 can include a display 208, a printer 1303, a barcode scanner 402, a visible light camera 403, and an infrared camera 404. FIG. 15 also illustrates a case 1502 enclosing the various electronic components and plurality of leveling knobs 1504. Leveling knobs 1504, also known as leveling feet or adjustable feet, are components used to adjust the level and stability of various objects such as furniture, equipment, and machines. The leveling knobs 1504 can be designed to be manually turned to raise or lower a component, helping to ensure that it sits evenly on the ground or another surface.

Leveling knobs 1504 typically consist of a knob-shaped head that is easy to grip and turn. The head is often textured or ribbed to provide better grip for the user's fingers. The knob can be attached to a threaded shaft. The threaded shaft is the part of the leveling knob 1504 that extends below the knob head. The threaded shaft can include a helical pattern of grooves (threads) cut into it, similar to a screw. This threaded shaft can be inserted into a corresponding threaded hole in the object that needs to be leveled.

To adjust the level, a user can turn the leveling knob 1504 either clockwise or counterclockwise. As the leveling knob 1504 is turned, the threaded shaft moves in or out of the threaded hole. Turning the leveling knob 1504 clockwise typically raises the object, while turning it counterclockwise lowers the object. At the bottom of the threaded shaft, there is usually a base or foot that makes contact with the ground or surface. This base can be flat or have a larger surface area to provide stability and distribute the weight of the object evenly.

Some leveling knobs 1504 come with a locking mechanism. Once the object is properly leveled, a user can tighten a locking nut or mechanism to secure the leveling knob 1504 in place, preventing accidental adjustments due to vibrations or movement. Leveling knobs 1504 are commonly made from materials such as plastic, metal (steel or stainless steel), or rubber. The choice of material depends on factors such as the weight of the object, the environment it will be used in, and the desired durability. Leveling knobs 1504 can be used in various applications, including furniture like tables and chairs, machinery, electronics, laboratory equipment, industrial workbenches, and more. Leveling knobs 1504 can be particularly useful in situations where the floor or surface is uneven, and you need to ensure that the object remains stable and level. Leveling knobs 1504 come in various sizes and designs to accommodate different weight capacities and applications. Some may have built-in shock absorption or vibration dampening features, making them suitable for sensitive equipment. Leveling knobs 1504 are simple yet effective tools for achieving stability and balance in a wide range of settings. They allow users to make precise adjustments to the height of objects, ensuring that they are level and secure.

Figure 16:
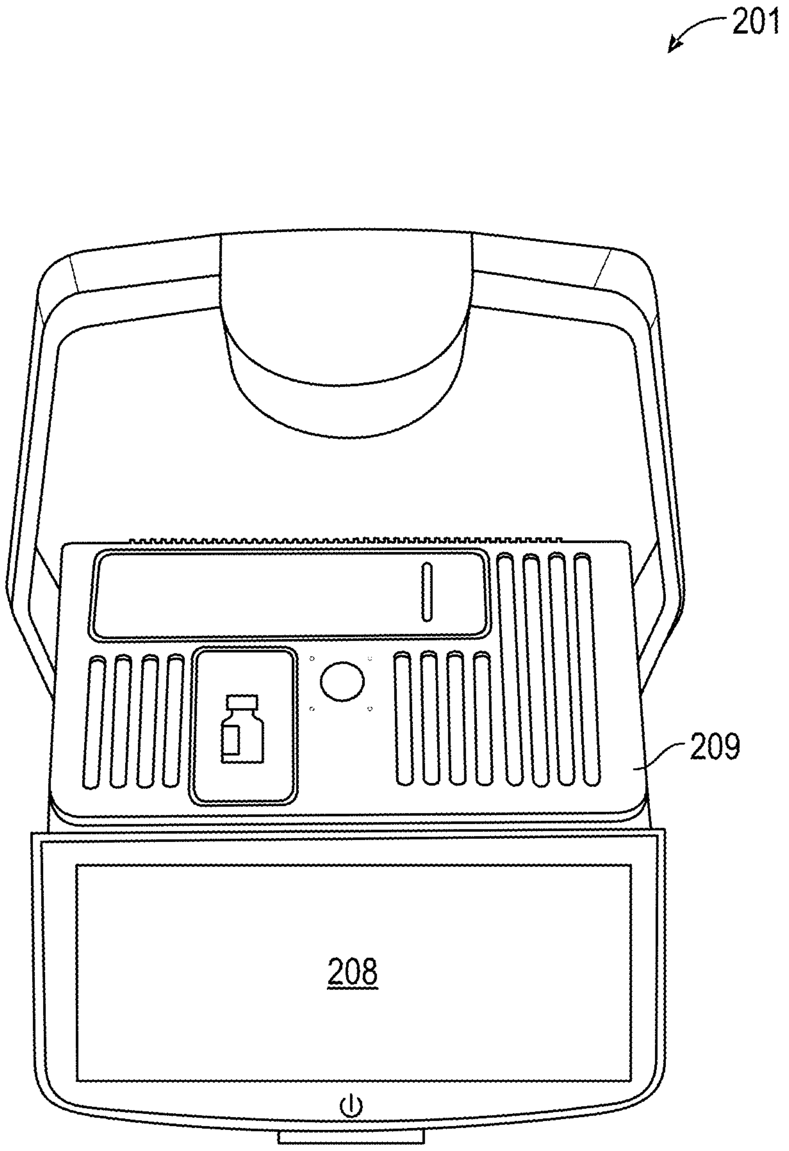
FIG. 16 illustrates a top view of a compounding assistance device.

FIG. 16 illustrates a top view of a compounding assistance device 201. FIG. 16 illustrates the tray 209 onto which various consumable objects and medications may be placed prior to and subsequent to the compounding process. FIG. 16 also illustrates a display 208 for presentation of the various prompts, alerts, and information for various workflows.

Figure 17:
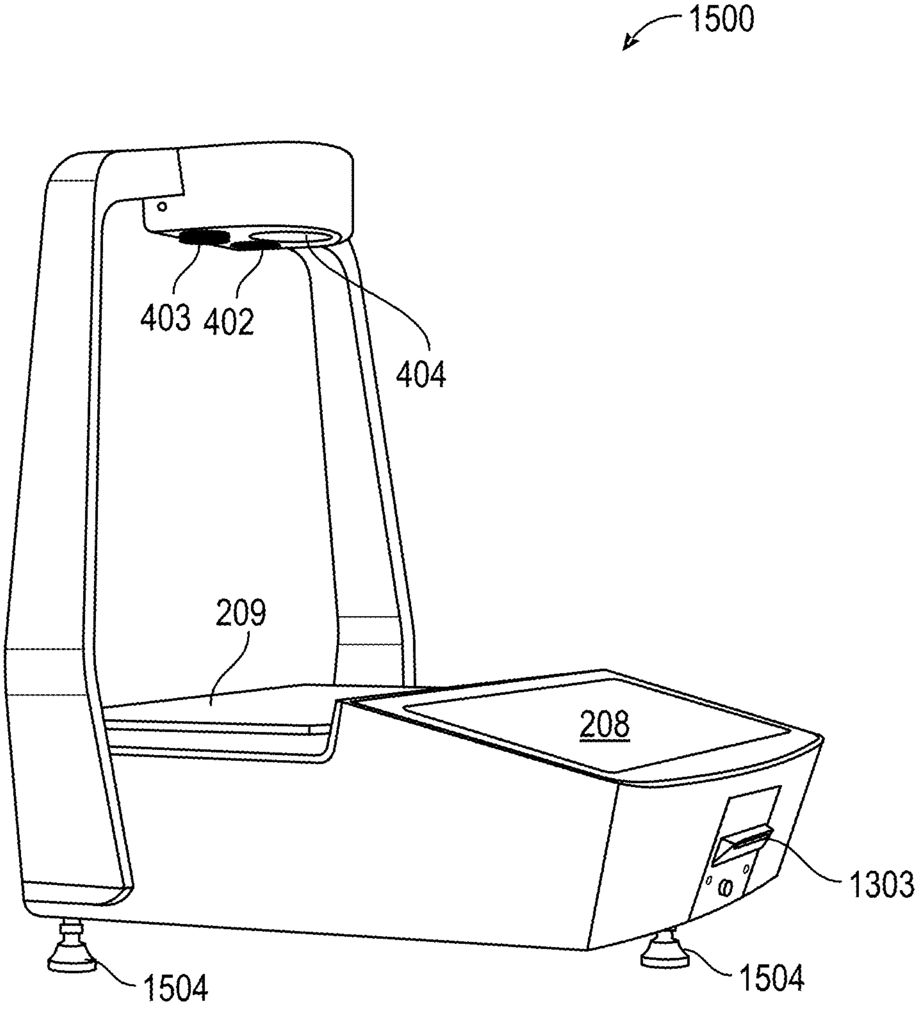
FIG. 17 illustrates a side view of a compounding assistance device.

FIG. 17 illustrates a side view of a compounding assistance device 201. The compounding assistance device 201 can include a display 208, a tray 209, a printer 1303, a barcode scanner 402, a visible light camera 403, and an infrared camera 404. FIG. 17 also illustrates two leveling knobs 1504 as described above.

Figure 18:
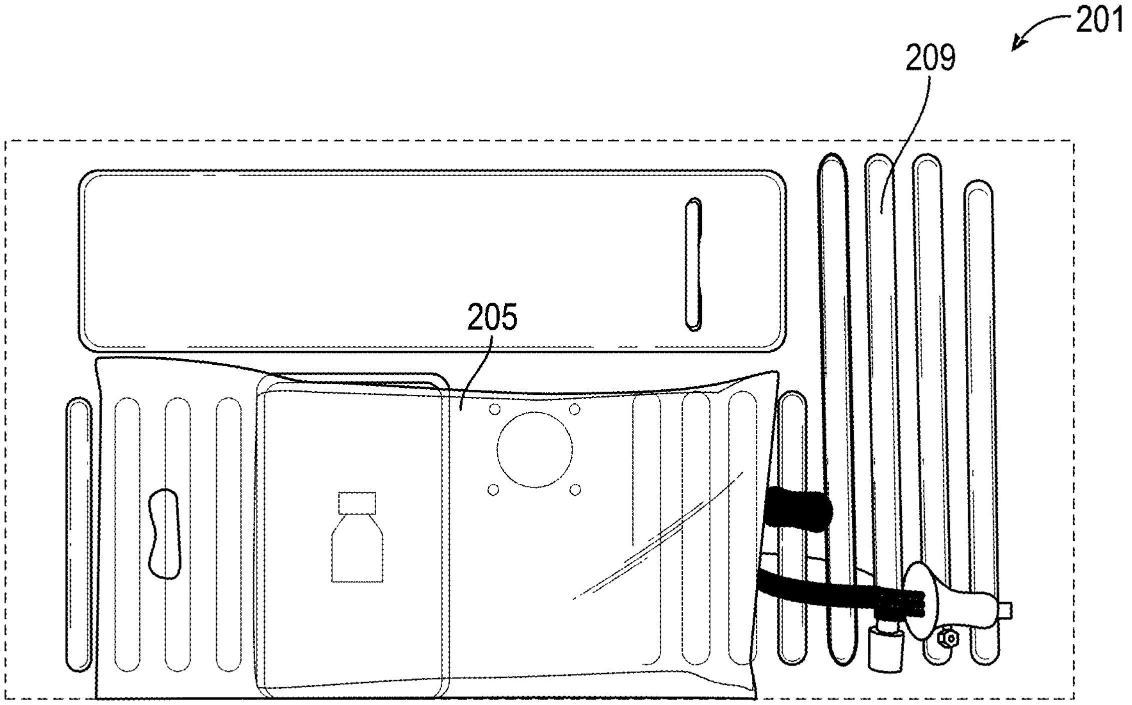
FIG. 18 illustrates a partial view of the tray of a compounding assistance device.

FIG. 18 illustrates a partial view of the tray 209 of a compounding assistance device 201. FIG. 18 illustrates an IV bag 205 placed in a proper orientation on the tray 209. In the proper orientation, the label or description of the contents of the IV bag 205 is clearly visible and in the field of view of the visible light camera 403, the infrared camera 404, and the barcode scanner 402. One or more images captured by at least one of the visible light camera 403 and the infrared camera 404 can be used to determine the orientation of the IV bag 205. In various embodiments, one or more images captured by at least one of the visible light camera 403 and the infrared camera 404 can be used to determine a volume of the IV bag 205. In various embodiments, one or more images captured by at least one of the visible light camera 403 and the infrared camera 404 can be used to determine a content of the IV bag 205. In various embodiments, the barcode scanner 402 can be used to determine a content of the IV bag 205. In the proper orientation on the tray 209, a weight sensor 301 that can be connected to the tray 209 can be used to determine the weight of the IV bag 205 and its contents.

Figure 19:
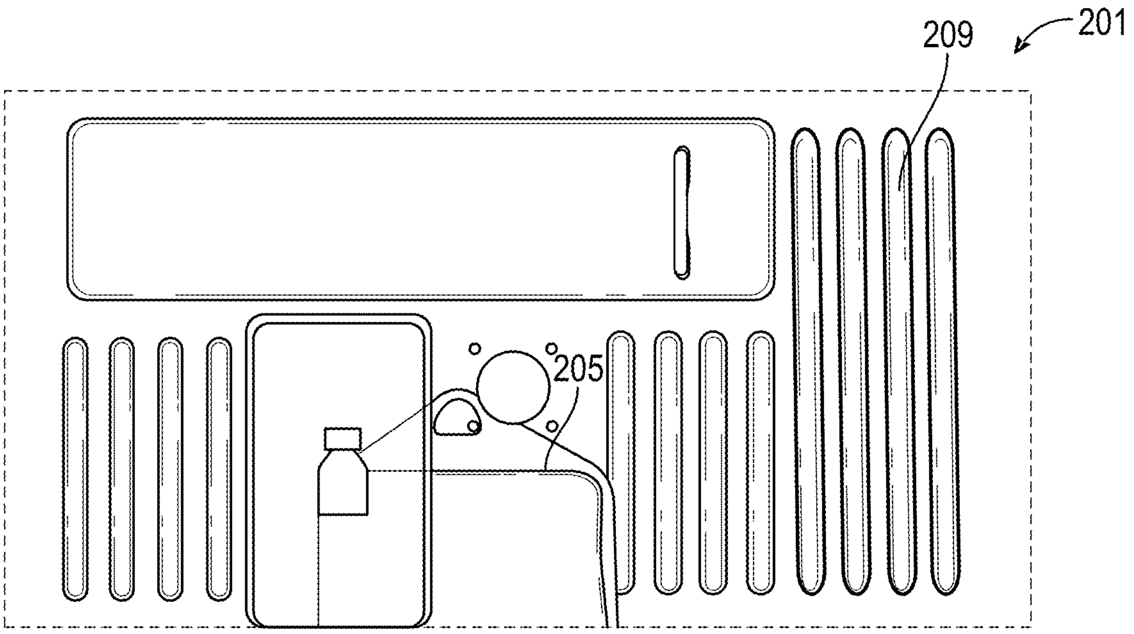
FIG. 19 illustrates a partial view of the tray of a compounding assistance device.

FIG. 19 illustrates a partial view of the tray 209 of a compounding assistance device 201. FIG. 19 illustrates an IV bag 205 placed in an improper orientation on the tray 209. As shown in FIG. 19 the IV bag 205 is placed in a perpendicular orientation on the tray 209. This orientation is improper for several reasons. First, at least a portion of the IV bag 205 is outside the field of view of the visible light camera 403 and the infrared camera 404. If the IV bag 205 is outside the field of view, the image may be partial and partial or obscured images may make identification of the IV bag 205 difficult or impossible. For example, if the IV bag 205 is at an improper orientation, the barcode scanner 402 may not be able to properly read the barcode on the IV bag 205. Additionally, the pharmacist may not be able to read the label on the image of the IV bag 205. As illustrated in FIG. 19, the text on the IV bag 205 is unreadable. Second the weight of the IV bag 205 is not fully resting on the tray 209 to be measured by the weight sensor 301. Therefore, the measured weight of the IV bag 205 can be inaccurate. The orientation of the IV bag 205 illustrated in FIG. 19 is just one of several possible improper orientations in which the IV bag 205 is at least partially outside the field of view or not completely on the tray 209.

Figure 20:
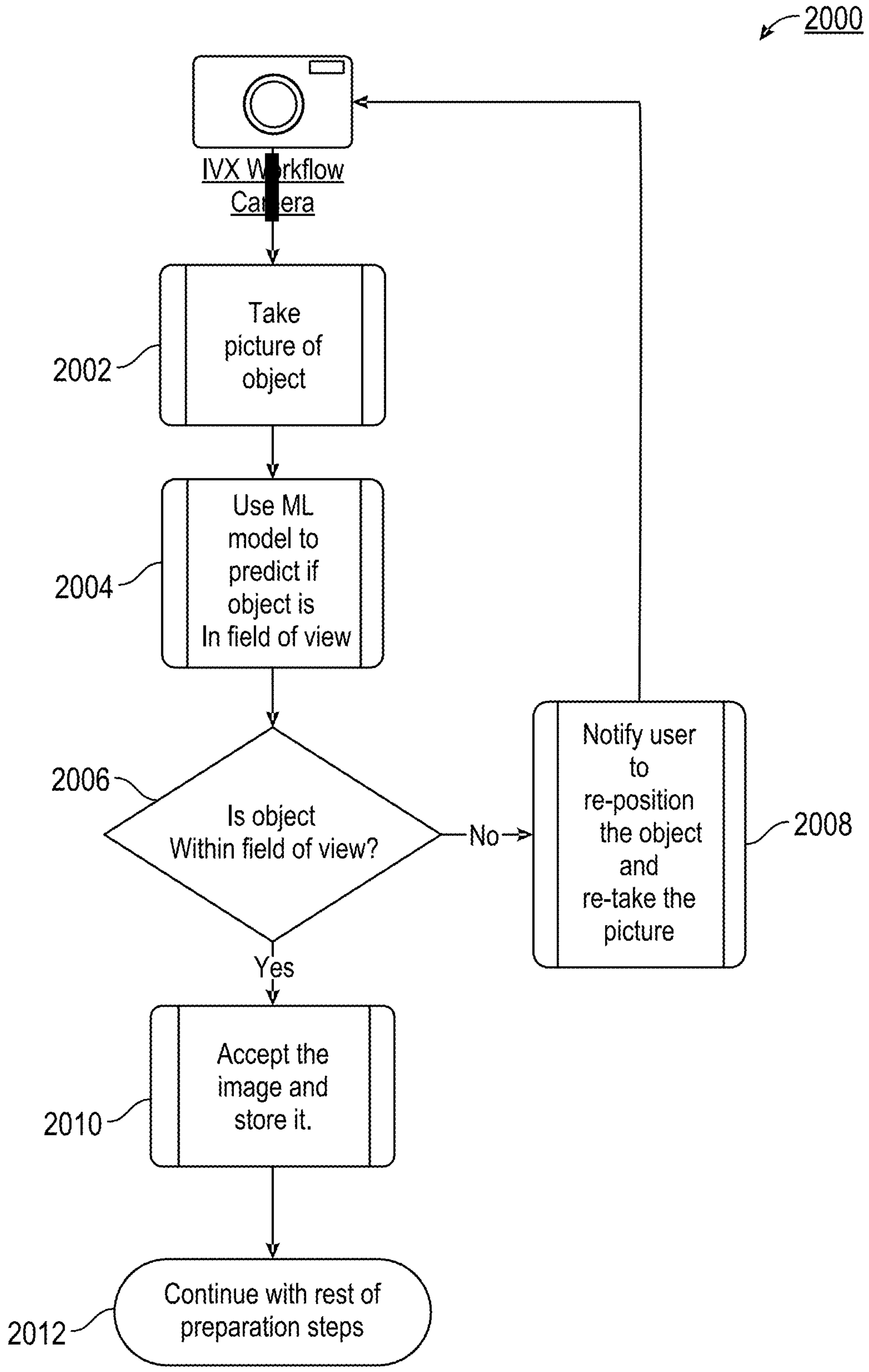
FIG. 20 illustrates an exemplary flow for a process for determining if the IV bag is properly placed on the tray.

FIG. 20 illustrates an exemplary flow for a process 2000 for determining if the IV bag 205 is properly placed on the tray 209. The compounding assistance device 201 can perform one of more steps of process 2000.

At block 2002, the visible light camera 403 or the infrared camera 404 can capture an image of an object placed on the tray 209. The object can be a consumable. A user can be prompted to place the consumable on the tray 209 via one or more instructions in workflow presented on the display 208. In various embodiments, the compounding assistance device 201 can receive an input from the user indicating that the consumable is on the tray 209 initiating a command to the visible light camera 403 or the infrared camera 404 to capture one or more images of the object. The one or more images can be stored in a memory 106 of the compounding assistance device 201.

At 2004, the processor 105 of the compounding assistance device 201 can access a first machine learning model to predict if the image of the object is within the field of view of the visible light camera 403 or the infrared camera 404. The first machine learning model can be stored in a memory 106 of the compounding assistance device 201. The first machine learning model can be trained to identify images of the object outside the field of view of the visible light camera 403 or the infrared camera 404.

At 2006, the processor 105 of the compounding assistance device 201 can use the one or more images of the object stored in the memory 106 of the compounding assistance device 201 to determine if the object is within the field of view.

At 2008, the processor 105 of the compounding assistance device 201 determines that one or more images of the object indicate that the object is outside the field of view of at least one of the visible light camera 403 or the infrared camera 404. The compounding assistance device 201 can prompt the user to reposition the object on the tray 209. After the object is repositioned, the compounding assistance device 201 can receive an input from the user that indicates the object is repositioned. The compounding assistance device 201 can capture one or more additional images of the object using the visible light camera 403 or the infrared camera 404.

At 2010, the processor 105 of the compounding assistance device 201 determines that one or more images of the object indicate that the object is within the field of view of at least one of the visible light camera 403 or the infrared camera 404. The one or more images of the object can be stored in a memory of the compounding assistance device 201.

At 2012, the processor 105 can continue with the rest of preparation steps from the workflow.

Figure 21:
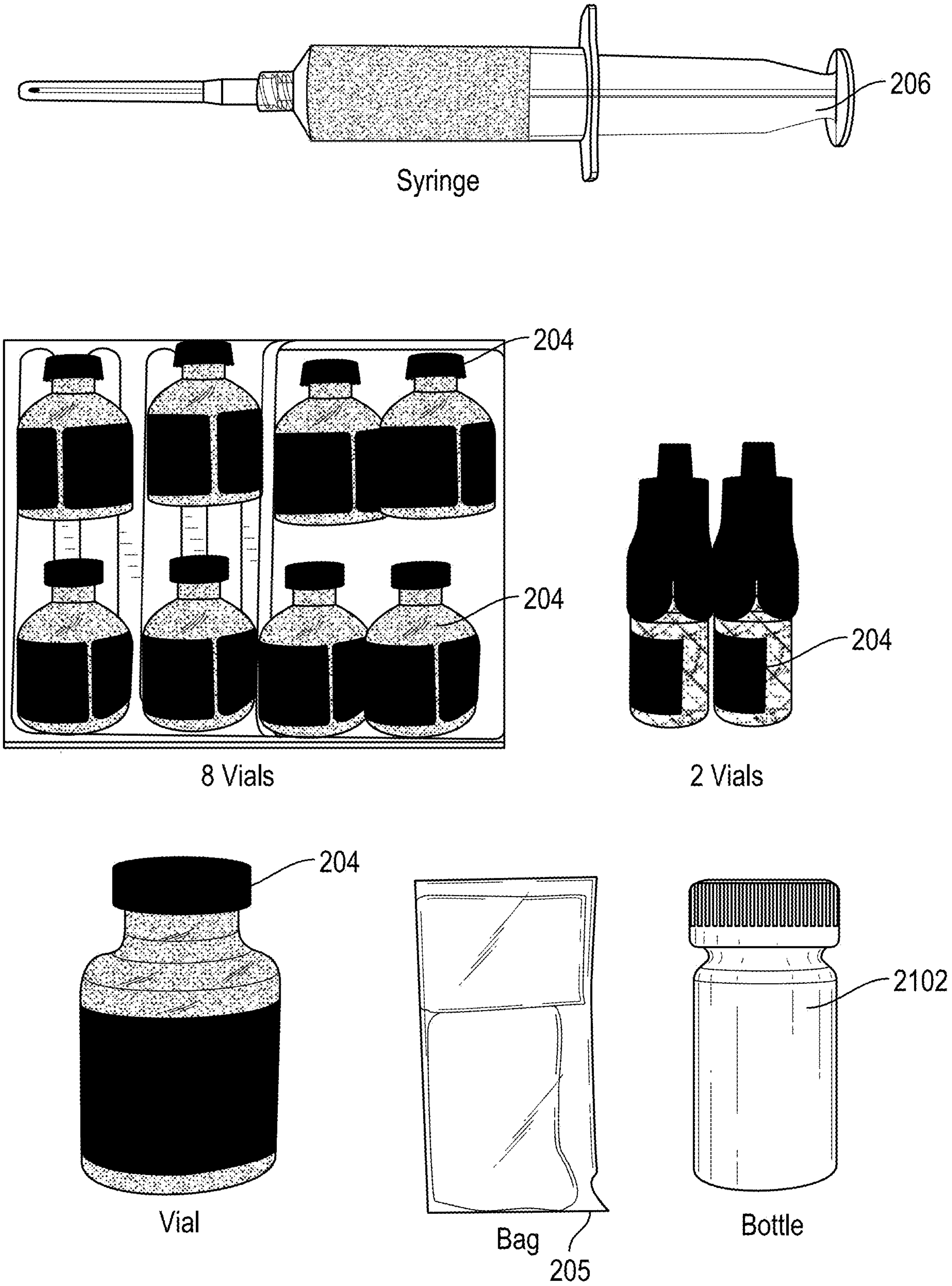
FIG. 21 illustrates various different objects that can be used during a compounding process.

FIG. 21 illustrates various different objects that can be used during a compounding process. The different objects can be a consumable product. In various embodiments, the objects can include a syringe 206, one or more vials 204, an IV bag 205 and a bottle 2102. A second machine learning model can be used to identify the object(s) captured in the one or more images captured by the visible light camera 403 or the infrared camera 404. The compounding assistance device 201 can determine a count of the various consumable products from the one or more images. The count of the various consumable products can be stored in the memory 106 of the compounding assistance device 201.

Figure 22:
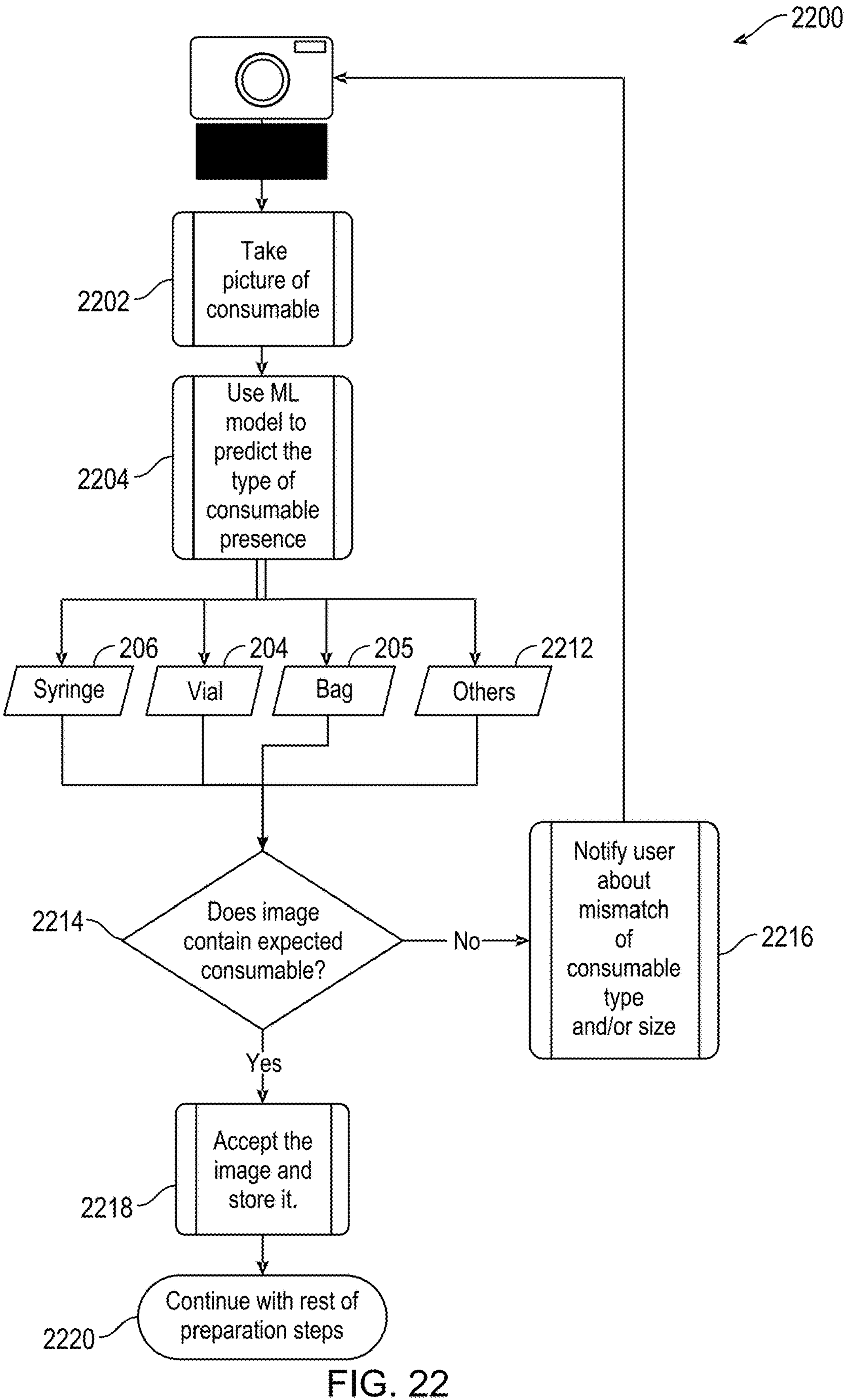
FIG. 22 illustrates an exemplary flow for a process for determining an object that is placed on the tray.

FIG. 22 illustrates an exemplary flow for a process for determining an object that is placed on the tray 209.

At block 2202, the visible light camera 403 or the infrared camera 404 can capture an image of an object placed on the tray 209. The object can be a consumable. A user can be prompted to place the consumable on the tray 209 via one or more instructions in workflow presented on the display 208. In various embodiments, the compounding assistance device 201 can receive an input from the user indicating that the consumable is on the tray 209 initiating a command to the visible light camera 403 or the infrared camera 404 to capture one or more images of the object. The one or more images can be stored in a memory 106 of the compounding assistance device 201.

At 2204, the processor 105 of the compounding assistance device 201 can access a second machine learning model to determine an identification of one or more objects captured in one or more images.

In various embodiments, the second machine learning model can identify the one or more objects as a syringe 206, one or more vials 204, an IV bag 205, or other objects 2212 (e.g., a bottle 2102). The second machine learning model can be stored in a memory 106 of the compounding assistance device 201. The second machine learning model can be trained to identify images of the object captured using the visible light camera 403 or the infrared camera 404.

At 2214, the processor 105 of the compounding assistance device 201 can access the second machine learning model to determine whether the one or more objects captured in one or more images is an expected consumable. The expected consumable can include one or more of a syringe 206, one or more vials 204, an IV bag 205, or other objects 2212 (e.g., a bottle 2102).

At 2216, the processor 105 determines that there is a mismatch between a type or quality of consumable as the detected objects in the one or more images and the one or more consumables expected as determined by the second machine learning model. A workflow routine can determine a type and a number of consumables used for a compounding process. The processor 105 can determine both a type and quantity of the objects captured in the one or more images using the second machine learning model. The number and type of consumables detected in the images can be compared with the number and type of consumable products expected by a workflow routine. If the processor 105 detects a mismatch between the number and type of consumables and the detected number and type of consumables a notification can be generated by the processor 105 and displayed on the display 208. In various embodiments, the compounding assistance device 201 can prompt the user to adjust an inventory of consumables on the tray 209. The compounding assistance device 201 can take an additional image after the quantity and/or type of consumable has been adjusted on the tray 209.

At 2218, the processor 105 of the compounding assistance device 201 can identify the object. The image can be stored in a memory 106 of the pharmaceutical compounding assistance device 201. In various embodiments, a count for the object can be adjusted.

At 2220, the processor 105 can continue with the rest of preparation steps from the workflow.

Figure 23:
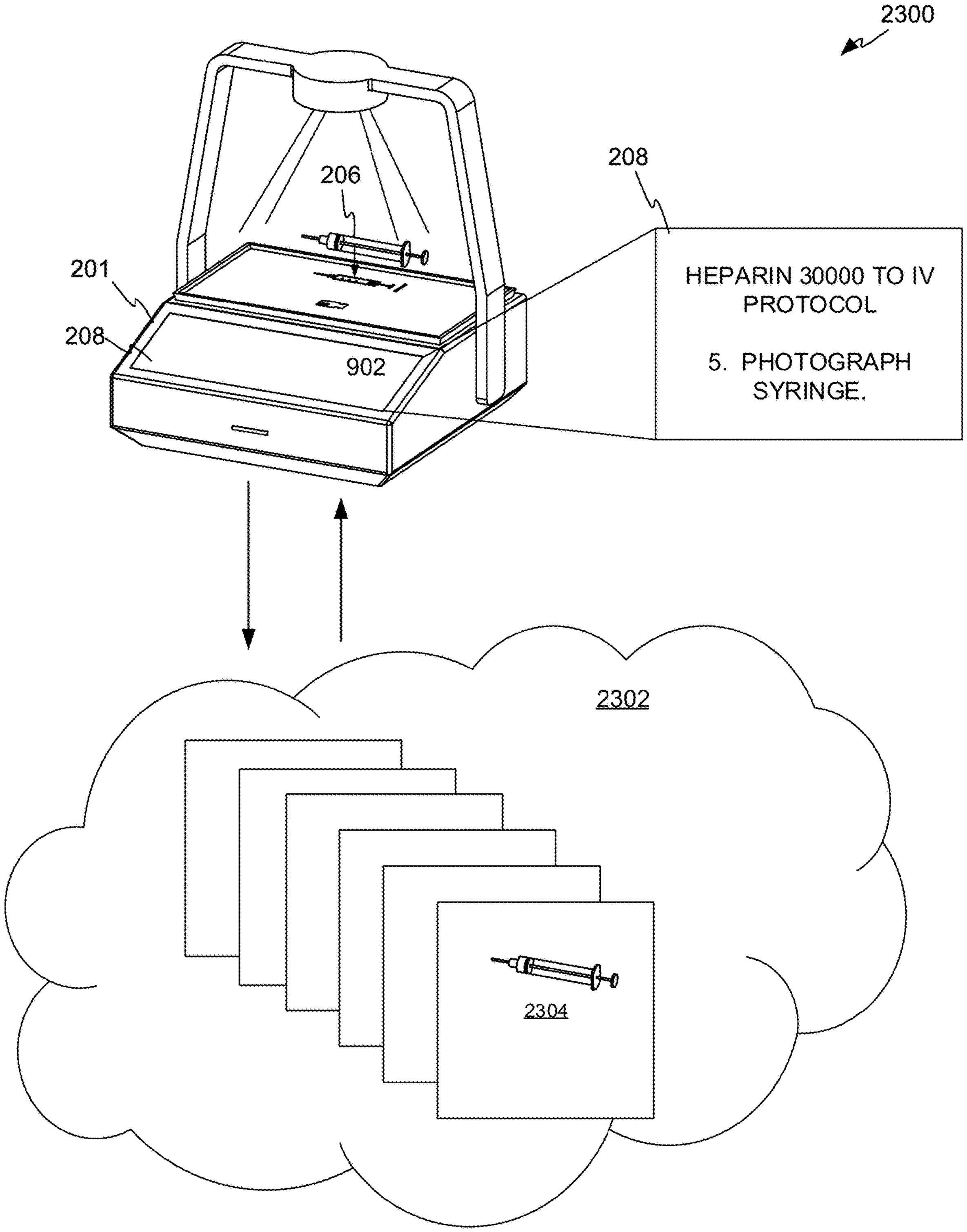
FIG. 23 illustrates a system for identifying an object using compounding assistance device.

FIG. 23 illustrates a system 2300 for identifying an object using compounding assistance device 201. The compounding assistance device 201 can communicate with a remote storage device 2302 (e.g., cloud storage device). The compounding assistance device 201 can capture one or more images of an object in the field of view of the tray 209. As illustrated in FIG. 23, the compounding assistance device 201 can identify the object as a syringe 206 using one or more images captured. The identification of the syringe 206 can be listed on the display 208. The compounding assistance device 201 can receive a library of images 2304 that can be downloaded to the compounding assistance device 201 and stored in a memory 106. The library of images 2304 can be used by the second machine learning module to identify the object on the tray 209.

In various embodiments, the compounding assistance device 201 can transmit one or more images captured by the compounding assistance device 201 to be stored as part of the library of images 2304 in a remote storage device 2302. In this way the new images can be used to further train the machine learning model.

Figure 24:
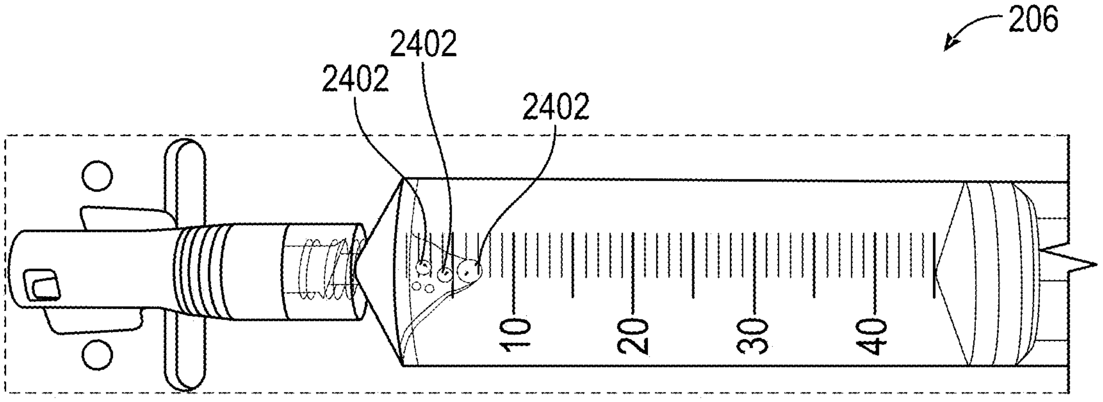
FIG. 24 illustrates a first exemplary image of a syringe having one or more bubbles.

FIG. 24 illustrates a first exemplary image of a syringe 206 having one or more bubbles 2402. The one or more air bubbles 2402.

If a large air bubble is injected into a blood vessel, it can travel through the bloodstream and block blood flow to vital organs. This condition is known as an air embolism and can be life-threatening, leading to serious complications like strokes or heart attacks.

Air bubbles in a syringe can displace the medication, leading to incorrect dosages being delivered to the patient. This can result in underdosing or overdosing, potentially leading to ineffective treatment or adverse reactions.

When air bubbles are present in the syringe, they may push out some of the medication or fluid, potentially causing backflow and contaminating the contents of the syringe. This can increase the risk of infection at the injection site.

If air bubbles are not removed from the syringe before administering the medication, patients may not receive the full intended dosage, reducing the effectiveness of the treatment. Injecting air bubbles into the tissue can cause pain, irritation, and discomfort at the injection site.

Figure 25:
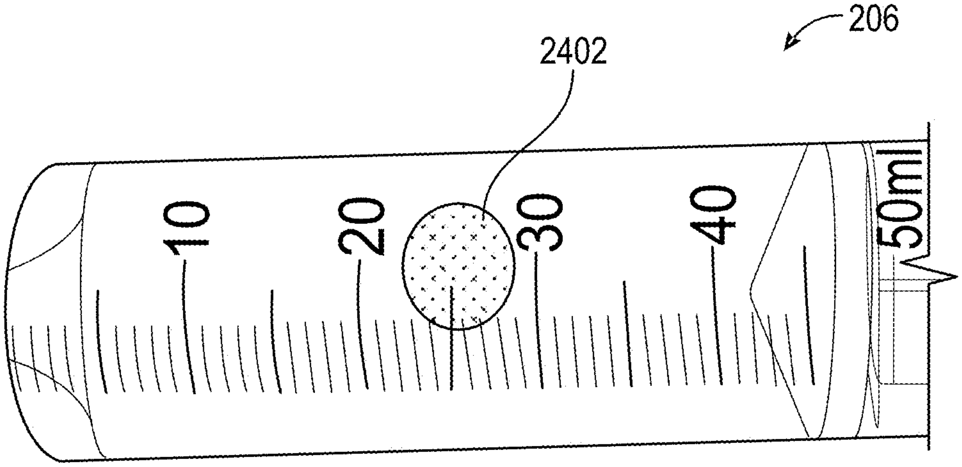
FIG. 25 illustrates a second exemplary image of a syringe having one or more bubbles.

FIG. 25 illustrates a second exemplary image of a syringe 206 having one or more bubbles 2402. The one or more air bubbles 2402.

Figure 26:
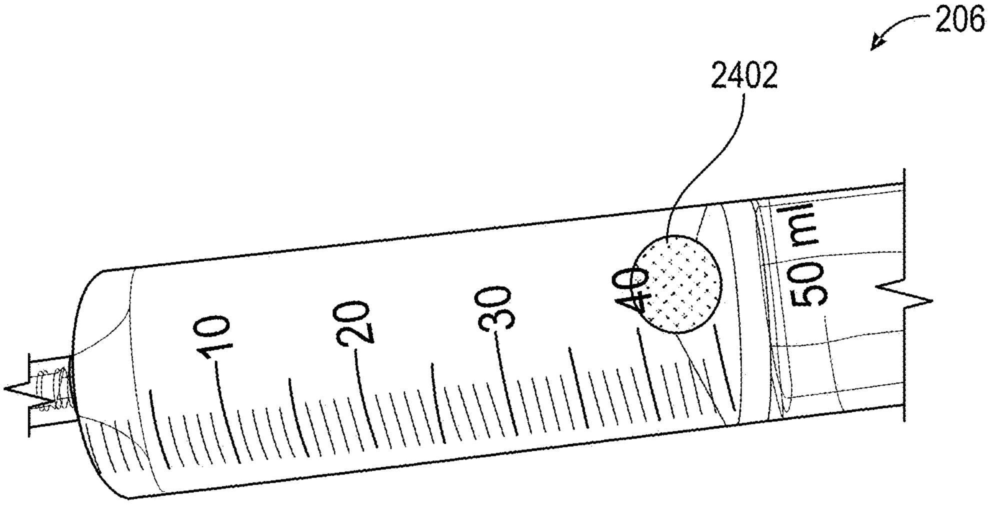
FIG. 26 illustrates a third exemplary image of a syringe having one or more bubbles.

FIG. 26 illustrates a third exemplary image of a syringe 206 having one or more bubbles 2402. The one or more bubbles 2402.

Figure 27:
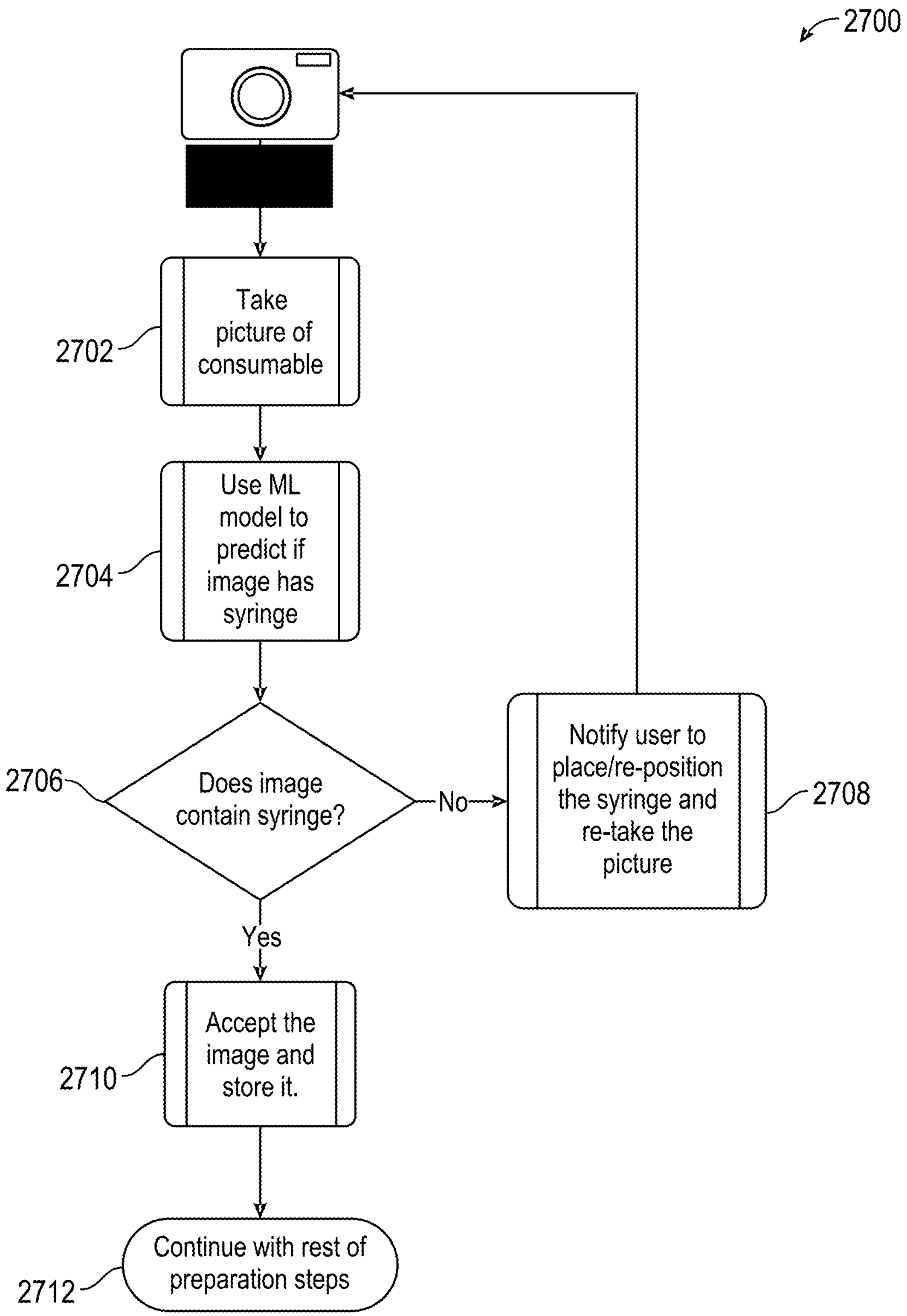
FIG. 27 illustrates an exemplary flow for a process for determining if the syringe is properly placed on the tray.

FIG. 27 illustrates an exemplary flow for a process for determining if the syringe 206 is properly placed on the tray 209.

At block 2702, the visible light camera 403 or the infrared camera 404 can capture an image of an object placed on the tray 209. The object can be a consumable (e.g., a syringe 206). A user can be prompted to place the consumable on the tray 209 via one or more instructions in workflow presented on the display 208. In various embodiments, the compounding assistance device 201 can receive an input from the user indicating that the consumable is on the tray 209 initiating a command to the visible light camera 403 or the infrared camera 404 to capture one or more images of the object. The one or more images can be stored in a memory 106 of the compounding assistance device 201.

At block 2704, the processor 105 of the compounding assistance device 201 can access a third machine learning model to predict if the image of the object is within the field of view of the visible light camera 403 or the infrared camera 404. The third machine learning model can be stored in a memory 106 of the compounding assistance device 201. The third machine learning model can be trained to identify images of the object outside the field of view of the visible light camera 403 or the infrared camera 404.

At block 2706, the processor 105 of the compounding assistance device 201 can use the one or more images of the object stored in the memory 106 of the compounding assistance device 201 to determine if the object is within the field of view.

At block 2708, the processor 105 of the compounding assistance device 201 determines that one or more images of the object indicate that the object is outside the field of view of at least one of the visible light camera 403 or the infrared camera 404. The compounding assistance device 201 can prompt the user to reposition the object on the tray 209. After the object is repositioned, the compounding assistance device 201 can receive an input from the user that indicates the object is repositioned. The compounding assistance device 201 can capture one or more additional images of the object using the visible light camera 403 or the infrared camera 404.

At block 2710, the processor 105 of the compounding assistance device 201 determines that one or more images of the object indicate that the object is within the field of view of at least one of the visible light camera 403 or the infrared camera 404. The one or more images of the object can be stored in a memory of the compounding assistance device 201.

At block 2712, the processor 105 can continue with the rest of preparation steps from the workflow.

Figure 28:
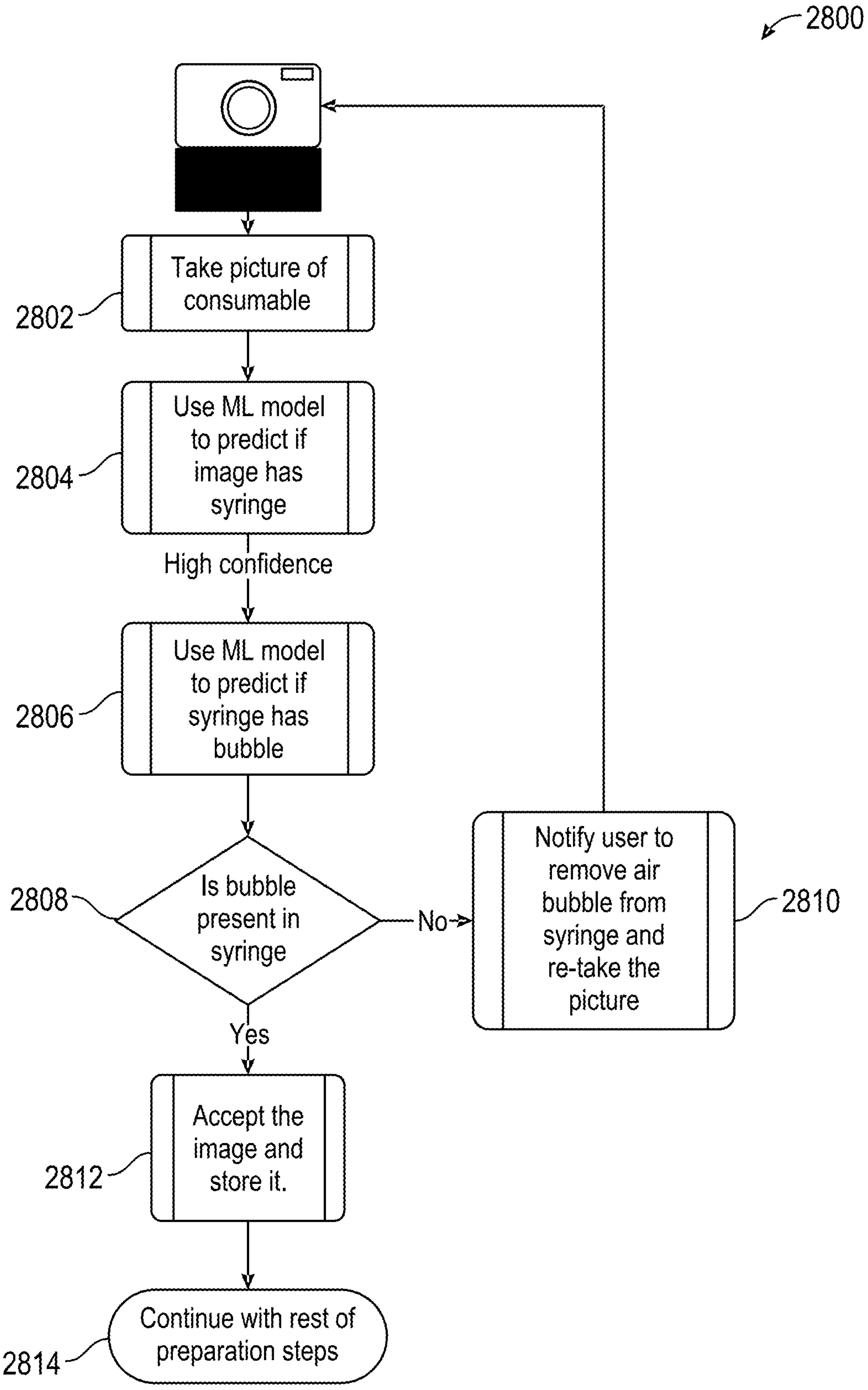
FIG. 28 illustrates an exemplary flow for a process for determining if the fluid in the syringe contains a bubble.

FIG. 28 illustrates an exemplary flow for a process for determining if the fluid in the syringe 206 contains a bubble.

At block 2802, the visible light camera 403 or the infrared camera 404 can capture an image of an object placed on the tray 209. The object can be a consumable (e.g., a syringe 206). A user can be prompted to place the syringe 206 on the tray 209 via one or more instructions in workflow presented on the display 208. In various embodiments, the compounding assistance device 201 can receive an input from the user indicating that the syringe 206 is on the tray 209 initiating a command to the visible light camera 403 or the infrared camera 404 to capture one or more images of the object. The one or more images can be stored in a memory 106 of the compounding assistance device 201.

At block 2804, the processor 105 of the compounding assistance device 201 can access a third machine learning model to predict if the image of the object is within the field of view of the visible light camera 403 or the infrared camera 404. The third machine learning model can be stored in a memory 106 of the compounding assistance device 201.

The third machine learning model can be trained to identify images of the object outside the field of view of the visible light camera 403 or the infrared camera 404.

At block 2806, the processor 105 of the compounding assistance device 201 can access a fourth machine learning model to determine if the fluid in the syringe 206 contains a bubble 2402. The fourth machine learning model can be stored in a memory 106 of the compounding assistance device 201. The fourth machine learning model can be trained to identify bubbles 2402 in images captured using the visible light camera 403 or the infrared camera 404.

An image analyzer machine learning model designed to detect air bubbles 2402 in a syringe 206 would utilize computer vision techniques and deep learning algorithms to identify and classify regions of an image as either air bubbles 2402 or other contents within the syringe 206. The technique can include collecting a dataset of images containing syringes 206 with varying levels of air bubbles 2402, lighting conditions, and syringe 206 orientations. These images should be labeled to indicate the presence and location of air bubbles 2402. The dataset would also include images without air bubbles 2402 to provide a balanced training set. The images should cover different scenarios to ensure the model's robustness.

The technique can initially involve preprocessing the images. The preprocessing can resize and normalize the images to a consistent size to ensure compatibility with the model. Data augmentation techniques like rotation, flipping, and varying lighting conditions can also be applied to increase the model's generalization ability.

The machine learning techniques can use a convolutional neural network (CNN) architecture, which is well-suited for image analysis tasks. A typical architecture could involve several convolutional layers followed by pooling layers to capture features at different scales. The techniques may also include normalization layers and dropout for regularization.

The techniques can include training the model using the labeled dataset. During training, the model learns to extract features relevant to detecting air bubbles 2402 and distinguishing them from other elements in the syringe 206. The model can be optimized using a suitable loss function, such as binary cross-entropy, which measures the difference between predicted and actual labels.

The techniques can include validation and tuning of the machine learning model. The technique can include setting aside a portion of the dataset for validation. After each training epoch, the training techniques can evaluate the model's performance on the validation set. The techniques can adjust hyperparameters, such as learning rate and network architecture, based on validation performance to prevent overfitting.

Once the model is trained and validated, the model can be tested on a separate set of images that it has not seen before. The techniques can evaluate the model's accuracy, precision, recall, and F1-score specifically for the detection of air bubbles. The techniques can fine-tune the model further if necessary.

The techniques can integrate the trained model into the image analyzer system. When new images of syringes 206 are captured, the model processes these images to detect air bubbles 2403. The output of the technique could include the location and severity of detected bubbles.

As the techniques are used in real-world scenarios, the system can gather feedback on its performance. Misclassifications or false positives/negatives should be analyzed to identify potential weaknesses in the model. If necessary, the model can be retrained using new data and improved techniques to enhance its accuracy and robustness.

The success of the model depends on the quality and diversity of the training data, the architecture of the neural network, and the careful fine-tuning of hyperparameters. Additionally, real-world implementation might involve additional considerations such as handling different types of syringes, variations in lighting conditions, and integration with other components of the syringe filling process.

At block 2808, the processor 105 of the compounding assistance device 201 can analyze the one or more images using the fourth machine learning model to determine the presence of bubble in the fluid in the syringe 206.

At block 2810, the processor 105 of the compounding assistance device 201 can detect the presence of one or more bubbles 2404 in the syringe 206. The compounding assistance device 201 can generate and display an alert on the display 208. The compounding assistance device 201 can prompt the user to remove the air bubbles 2404 from the syringe 206. Following input from the user that the air bubbles 2404 have been removed, the compounding assistance device 201 can capture one or more additional images of the syringe 206 to confirm.

At block 2810, the processor 105 of the compounding assistance device 201 determines that one or more images of the syringe 206 do not detect any bubbles in the fluid. The one or more images of the object can be stored in a memory of the compounding assistance device 201.

At block 2812, the processor 105 can continue with the rest of preparation steps from the workflow.

Figure 29:
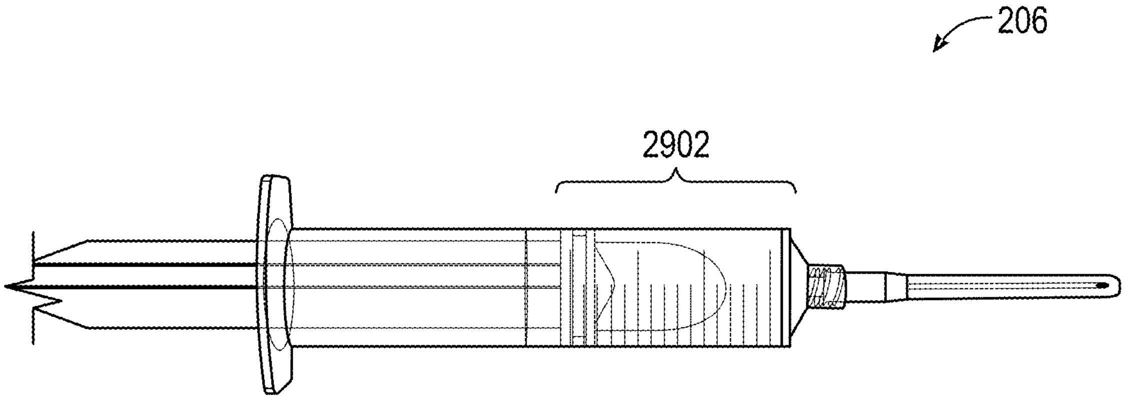
FIG. 29 illustrates an image of a syringe.

FIG. 29 illustrates an image of a syringe 206. In various embodiments, a fifth machine learning model can analyze the image of the syringe 206 to determine a volume of fluid (as indicated by the position 2902 of the plunger in the image.

Using a machine learning model to determine the volume of an intravenous (IV) bag involves leveraging computer vision techniques and potentially other data sources. The technique can gather a diverse dataset of images of IV bags with varying fill levels. These images can cover different types of bags, lighting conditions, and orientations. The dataset needs to be labeled with the corresponding volume of fluid in each bag. Additionally, information about the bag's dimensions and shape could also be collected.

In various embodiments, the techniques can resize and normalize the images to a consistent size. If the dataset includes images captured in different lighting conditions, the techniques can apply histogram equalization or color correction to standardize the images. Data augmentation techniques can be used to increase the model's robustness.

In various embodiments a convolutional neural network (CNN) can be used to extract features from the images. A CNN architecture may be used. However, a more complex architecture may capture finer details. The techniques may consider including regression layers at the end of the network to predict the volume.

In various embodiments the model may be trained using the labeled dataset. In this case, it may be a regression task, so techniques can use a loss function that measures the difference between predicted volumes and actual volumes. Mean squared error (MSE) is a common choice for regression tasks. During training, the model learns to map image features to the corresponding volume.

In various embodiments, the techniques can set aside a portion of the dataset for validation. Monitor the model's performance on this validation set and adjust hyperparameters, such as learning rate and architecture, to improve accuracy. The techniques can avoid overfitting by regularly evaluating the model's performance on the validation set.

In various embodiments the model can be tested and evaluated. After training and validation, test the model on a separate set of images it has not seen before. The testing routine can measure the model's accuracy and assess its ability to predict the volume of fluid accurately. The technique can use metrics like Mean Absolute Error (MAE) or Root Mean Squared Error (RMSE) to quantify the model's performance.

Once the model has demonstrated satisfactory performance, integrate it into the IV bag volume measurement system. When a new image of an IV bag is captured, the model processes the image and provides an estimate of the fluid volume. This information can be displayed to medical staff or integrated with other relevant systems.

In various embodiments, the techniques can gather feedback on the model's predictions in real-world scenarios. The techniques can analyze cases where the model's predictions differ significantly from actual measurements. If necessary, update the model with new data, fine-tuned hyperparameters, or improved techniques to enhance accuracy.

Factors like bag transparency, shape, and occlusions might affect the accuracy of the model's predictions. Therefore, real-world deployment may require additional validation and cross-validation with manual measurements.

Figure 30:
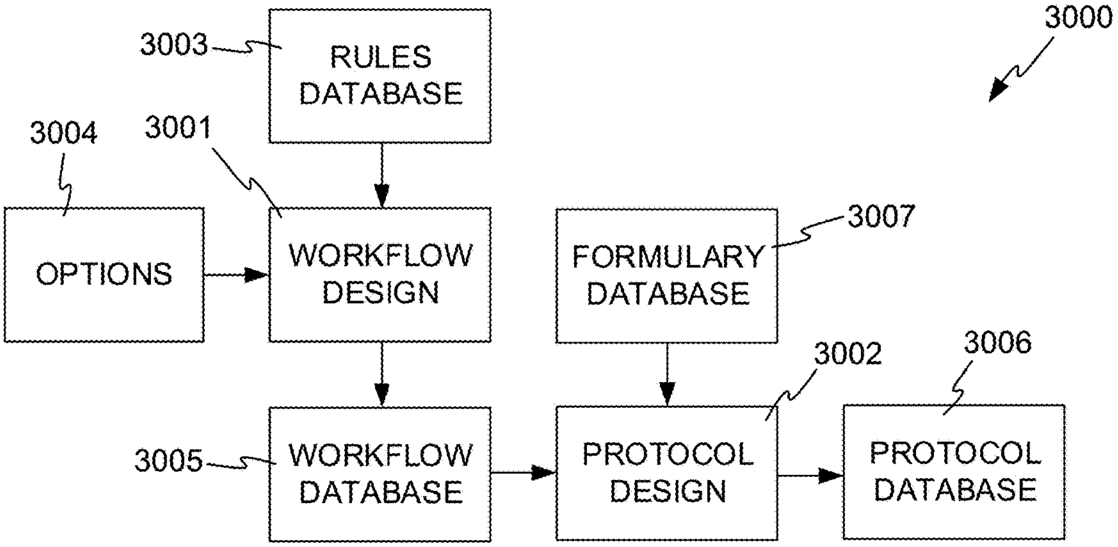
FIG. 30 illustrates a block diagram of a system in accordance with embodiments of the invention, for developing workflows and protocols for pharmaceutical compounding.

FIG. 30 illustrates a block diagram of a system 3000 in accordance with embodiments of the invention, for developing workflows and protocols for pharmaceutical compounding. The system includes modules for workflow design 3001 and protocol design 3002, each accepting inputs from a user and from one or more databases.

For example, workflow design module 3001 accepts workflow templates from rules database 3003 and specifications of one or more options 3004 from a user of the system. Individual designed workflows are stored in workflow database 3005 and become inputs to protocol design module 3002. Finished protocols are stored in protocol database 3006. A list of pharmaceuticals available for compounding is kept in a formulary database 3007.

Figure 31:
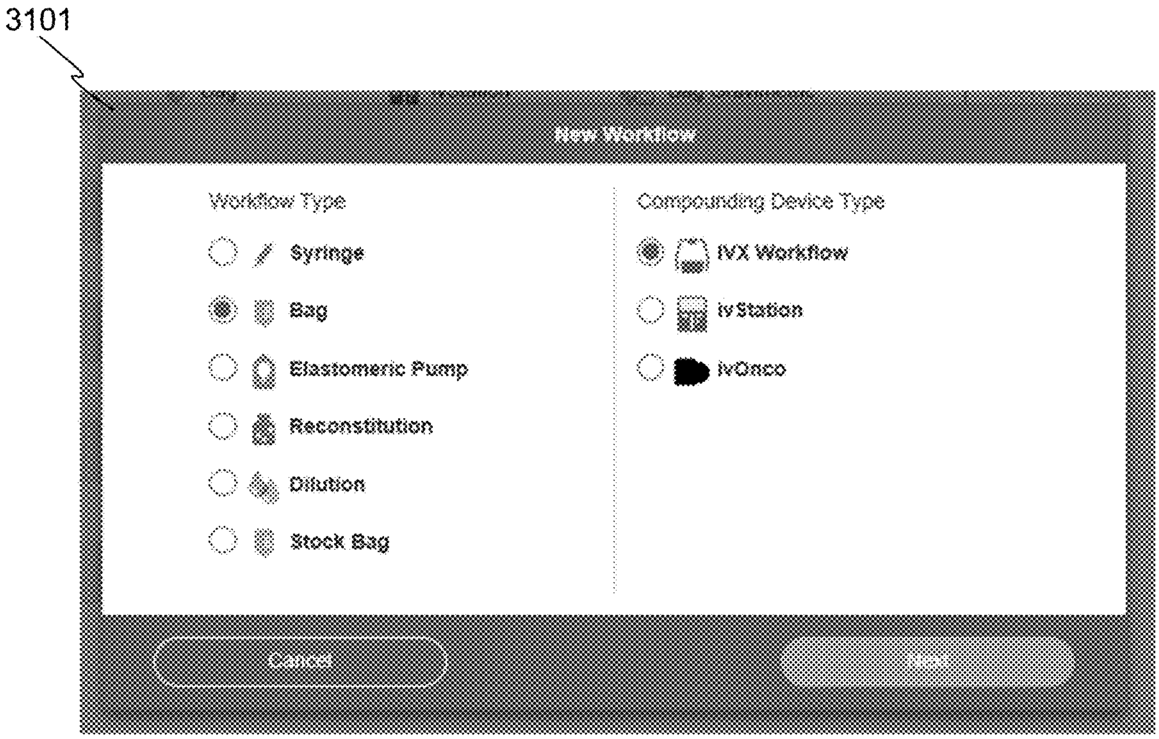
FIG. 31 illustrates a first user interface screen of workflow design module, in accordance with embodiments of the invention.

FIG. 31 illustrates a first user interface screen 3101 of workflow design module 3001, in accordance with embodiments of the invention. Screen 3101 presents the user with number of workflow types differentiated by the kind of vehicle in which a completed compounded pharmaceutical is to be delivered. For example, the compounded pharmaceutical may be delivered in a bag, as described above, or in a syringe or elastomeric pump. In other types, the pharmaceutical may be reconstituted in its existing container or may be diluted in its existing container.

Screen 3101 also requests a specification of the type of device on which the compounding will be performed, for example a compounding assistance device such as compounding assistance device 201, a robotic compounder, or a robotic compounder specifically configured for handling dangerous drugs such as cancer treatment drugs. Other workflow or device types may be envisioned.

In example screen 3101, the user has selected to design a workflow for compounding a pharmaceutical to be delivered in an IV bag 205, on a compounding assistance device 201. Selection of items from a user interface in embodiments of the invention may be accomplished by any suitable selection mechanism, for example a click with a cursor on a displayed selection, a touch of a finger or stylus on a touchscreen display, a sequence of keystrokes performed on a keyboard, or another selection mechanism.

Figure 32:
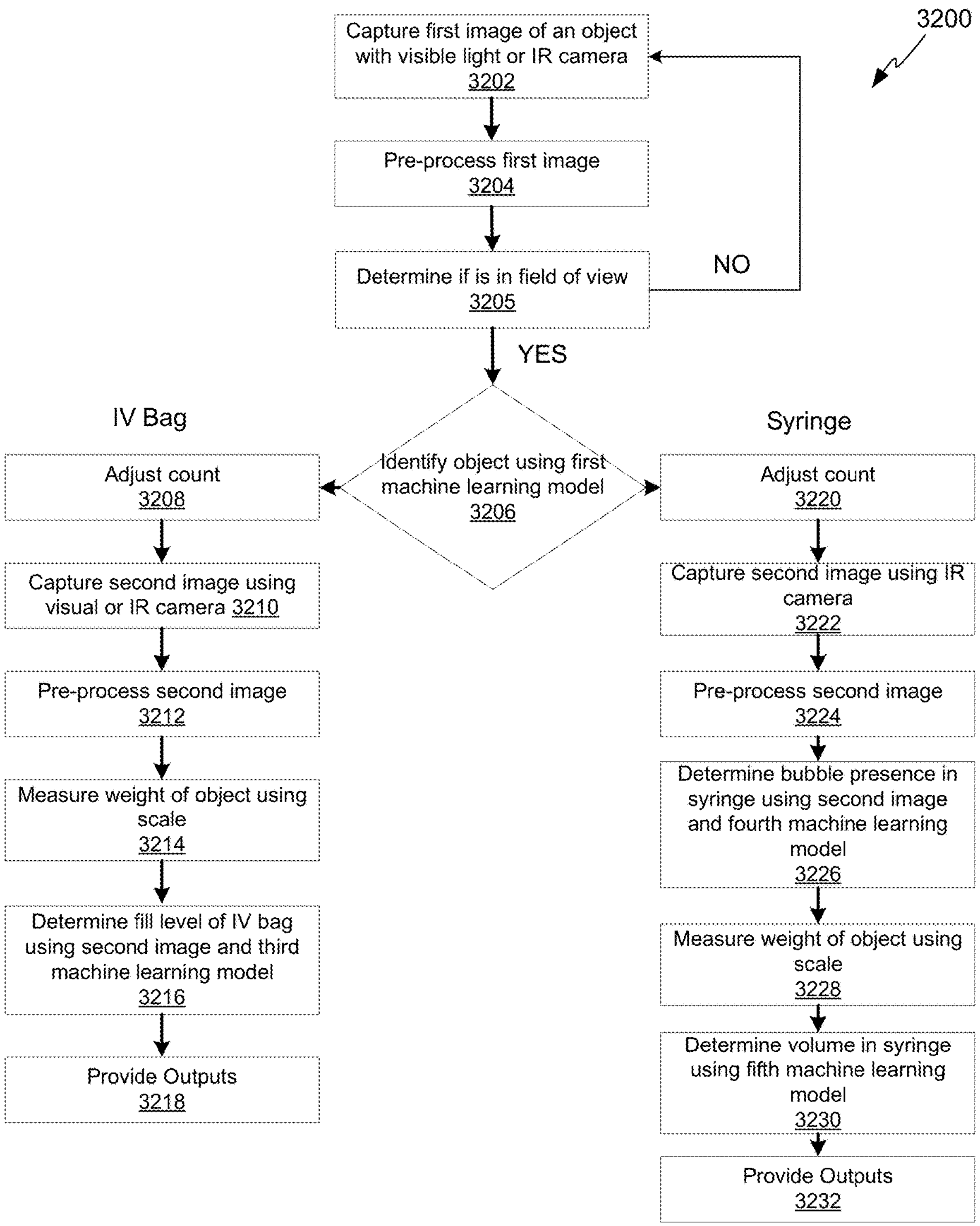
FIG. 32 illustrates a machine learning process implemented for a compounding process.

FIG. 32 illustrates a machine learning process 3200 implemented for a compounding process.

At block 3202, the visible light camera 403 or the infrared camera 404 can capture an image of an object placed on the tray 209. The object can be a consumable. A user can be prompted to place the consumable on the tray 209 via one or more instructions in workflow presented on the display 208. In various embodiments, the compounding assistance device 201 can receive an input from the user indicating that the consumable is on the tray 209 initiating a command to the visible light camera 403 or the infrared camera 404 to capture one or more images of the object. The one or more images can be stored in a memory 106 of the compounding assistance device 201.

At block 3204, the processor 105 can pre-process the one or more images. The preprocessing can resize and normalize the images to a consistent size to ensure compatibility with the model. Data augmentation techniques like rotation, vertical flipping, horizontal flipping, shifting width or height, adjusting zoom levels, and adjusting brightness to account for various lighting conditions can also be applied to increase the model's generalization ability.

At block 3205, the processor 105 of the compounding assistance device 201 can access a first machine learning model to determine if the object at least partially outside the field of view of either the visible light camera 403 or the infrared camera 404. If the first machine learning model determines that the object is at least partially outside of the field of view of the visible light camera 403 or the infrared camera 404 the processor can prompt the user to reposition the camera. The compounding assistance device 201 can return to block 3202 to re-capture an image of an object placed on the tray 209.

At block 3206, the processor 105 of the compounding assistance device 201 can access a second machine learning model to determine an identification of one or more objects captured in one or more images. In various embodiments, the one or more objects can be identified as an IV bag 205 or a syringe 206.

At block 3208, the processor 105 of the compounding assistance device 201 identifies the object as an IV bag 205 using the first machine learning model. In various embodiments, the processor 105 of the compounding assistance device 201 can determine a number of IV bags 205 in the image. Upon determining the number of IV bags 205 a counter for IV bag 205 can be adjusted to reflect the number of IV bags 205 in the one or more images. In various embodiments, the adjustment increments the number of IV bags 205 used by the compounding assistance device 201. The count can be stored in a memory 106 of the compounding assistance device 201.

At block 3210, the processor 105 of the compounding assistance device 201 can generate instructions for to the visible light camera 403 or the infrared camera 404 to capture one or more second images of the object. In some embodiments, the first image of the object can be captured with the visible light camera 403 and the second image of the object can be captured using the IR camera 404. In various embodiments, the first image of the object can be captured with the IR camera 404 and the second image of the object can be captured using the visible light camera 403. The one or more second images of the object can be stored in a memory 106 of the compounding assistance device 201.

At block 3212, the processor 105 can pre-process the one or more second images. The preprocessing can resize and normalize the images to a consistent size to ensure compatibility with the model. Data augmentation techniques like rotation, flipping, and varying lighting conditions can also be applied to increase the model's generalization ability.

At block 3214, the processor 105 of the compounding assistance device 201 can generate instructions for to weight sensor to measure the weight of the object. The weight can be stored in a memory 106 of the compounding assistance device 201.

At block 3216, the processor 105 of the compounding assistance device 201 can determine a fill level of an IV bag 205 using one or more second images and a third machine learning model. In various embodiments, an image analyzer can use one or more images to determine a fill level of the IV bag 205. In various embodiments, the weight sensor can use the weight of the IV bag 205 to determine a fill level of the IV bag 205. In various embodiments, both the image analyzer and the weight sensor can be used to determine a fill level of the IV bag 205. In some embodiments, for example, the weight determined by the weight sensor can be ingested as an input into the third machine learning model in addition to the one or more second images. In some embodiments, and based on these inputs, the third machine learning model can output a determination of the fill level of the IV bag 205.

At block 3218, the processor 105 of the compounding assistance device 201 can provide inputs to the user via the display 208.

At block 3220, the processor 105 of the compounding assistance device 201 identifies the object as a syringe 206 using the first machine learning model. In various embodiments, the processor 105 of the compounding assistance device 201 can determine a number of syringes 206 in the image. Upon determining the number of syringes 206 a counter for syringes 206 can be adjusted to reflect the number of syringes 206 in the one or more images. In various embodiments, the adjustment increments the number of syringes 206 used by the compounding assistance device 201. The count can be stored in a memory 106 of the compounding assistance device 201.

At block 3222, the processor 105 of the compounding assistance device 201 can generate instructions for to the visible light camera 403 or the infrared camera 404 to capture one or more second images of the object. In some embodiments, the first image of the object can be captured with the visible light camera 403 and the second image of the object can be captured using the IR camera 404. In various embodiments, the first image of the object can be captured with the IR camera 404 and the second image of the object can be captured using the visible light camera 403. The one or more second images of the object can be stored in a memory 106 of the compounding assistance device 201.

At block 3224, the processor 105 can pre-process the one or more second images. The preprocessing can resize and normalize the images to a consistent size to ensure compatibility with the model. Data augmentation techniques like rotation, flipping, and varying lighting conditions can also be applied to increase the model's generalization ability.

At block 3226, the processor 105 of the compounding assistance device 201 can access a fourth machine learning model to determine the presence of bubbles 2402 in the fluid in the syringe 206 as described above.

At block 3228, the processor 105 of the compounding assistance device 201 can generate instructions for to weight sensor to measure the weight of the object. The weight can be stored in a memory 106 of the compounding assistance device 201.

At block 3230, the processor 105 of the compounding assistance device 201 can determine a fill level of an IV bag 205 using one or more second images and a third machine learning model. In various embodiments, an image analyzer can use one or more images to determine a fill level of the IV bag 205. In various embodiments, the weight sensor can use the weight of the IV bag 205 to determine a fill level of the IV bag 205. In various embodiments, both the image analyzer and the weight sensor can be used to determine a fill level of the IV bag 205.

At 3232, the processor 105 of the compounding assistance device 201 can provide inputs to the user via the display 208.

Figure 33:
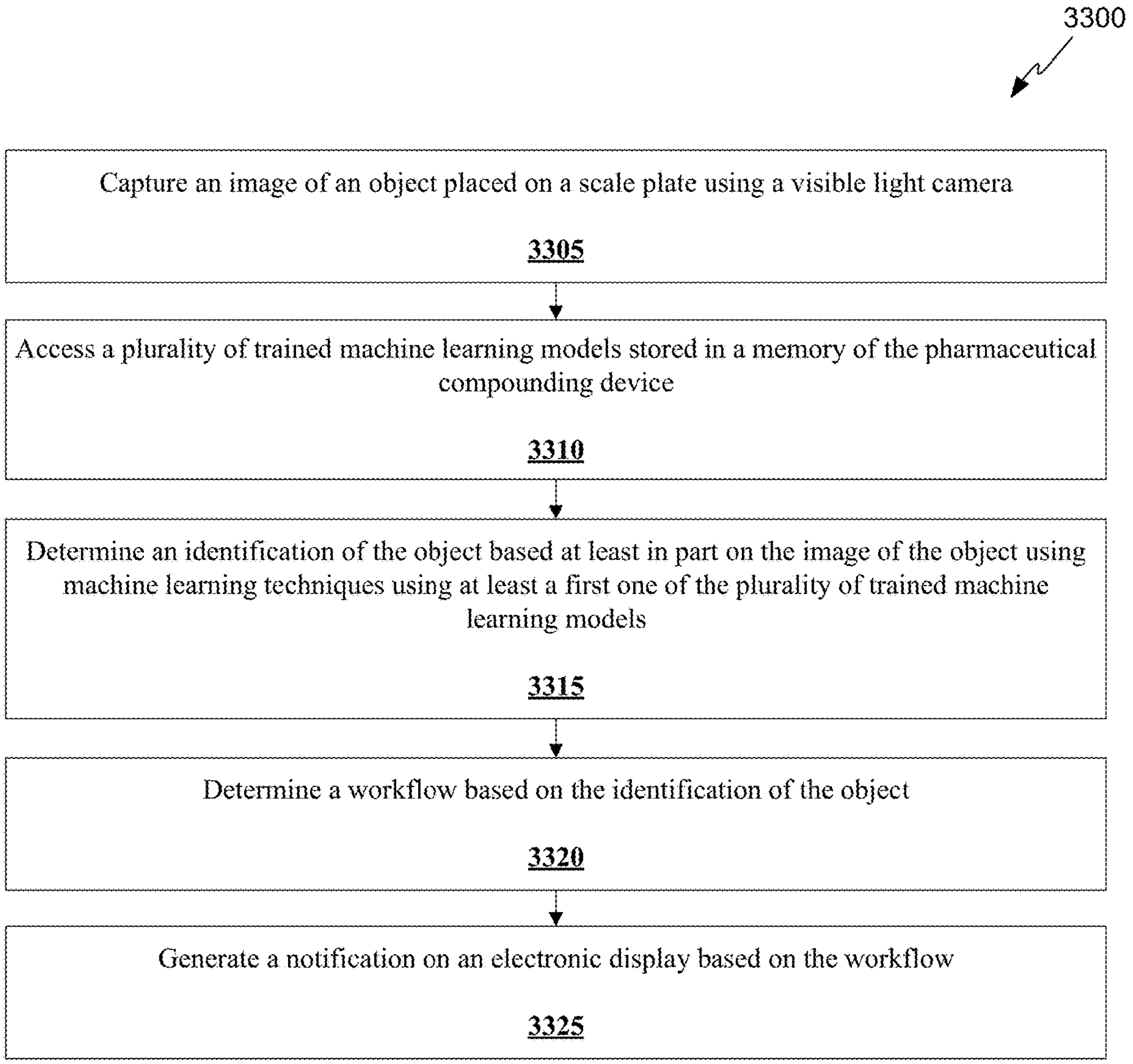
FIG. 33 is a flow chart of a process, according to an example of the present disclosure.

FIG. 33 is a flow chart of a process 3300 for a compounding operation, according to an example of the present disclosure. According to an example, one or more process blocks of FIG. 33 may be performed by compounding assistance device 201.

At block 3305, process 3300 may include capturing an image of an object placed on a scale plate using a visible light camera. For example, compounding assistance device 201 may capture an image of an object placed on a scale plate using a visible light camera, as described above. Block 3305 can include controlling a visible light source to illuminate the visible object.

At block 3310, process 3300 may include accessing a plurality of trained machine learning models stored in a memory of the pharmaceutical compounding device. For example, compounding assistance device 201 may access a plurality of trained machine learning models stored in a memory of the pharmaceutical compounding device, as described above.

At block 3315, process 3300 may include determining an identification of the object based at least in part on the image of the object using machine learning techniques using at least a first one of the plurality of trained machine learning models. For example, compounding assistance device 201 may determine an identification of the object based at least in part on the image of the object using machine learning techniques using at least a first one of the plurality of trained machine learning models, as described above.

At block 3320, process 3300 may include determining a workflow based on the identification of the object. For example, compounding assistance device 201 may determine a workflow based on the identification of the object, as described above.

At block 3325, process 3300 may include generating a notification on an electronic display based on the workflow. For example, compounding assistance device 201 may generate a notification on an electronic display based on the workflow, as described above.

Process 3300 may include additional implementations, such as any single implementation or any combination of implementations described below and/or in connection with one or more other processes described elsewhere herein.

A first implementation, process 3300 further includes comparing the identification of the object to a plurality of consumable products expected for the workflow; and when there is a mismatch between the identification of the object and the expected consumable products, generate an alert to display on the electronic display.

A second implementation, alone or in combination with the first implementation, process 3300 further includes generating a count for a consumable product based on the identification and on the image with a second one of the plurality of trained machine learning models; storing the count in a memory of the pharmaceutical compounding device.

A third implementation, alone or in combination with the first and second implementation, process 3300 further includes determining that the object is an intravenous fluid bag; determining based at least in part on the image of the object using at least a third one of the plurality of trained machine learning models whether the object is within a field of view of the image; when the captured image of the object is determined as being at least partially outside the field of view, generate an alert to reposition the intravenous fluid bag on the scale plate and capture a second image of the object; when the captured image of the object is determined as being inside of the field of view, store the image and continue the workflow.

A fourth implementation, alone or in combination with one or more of the first through third implementations, process 3300 further includes determining that the object is a syringe; capturing a second image with of the object placed on the scale plate with an infrared camera; detecting a presence of an air bubble inside a fluid within the syringe based at least in part on the second image and using a fourth one of the plurality machine learning models; and generating an alert that is displayed on the pharmaceutical compounding device when the presence of the air bubble is detected. The process 3300 can include controlling the IR light source used to illuminate the object.

A fifth implementation, alone or in combination with one or more of the first through fourth implementations, process 3300 further includes determining that the object is a syringe; capturing a second image with of the object placed on the scale plate with an infrared camera; determining a volume of a fluid inside the syringe based at least in part on the second image and using a fourth one of the plurality of machine learning models; and storing the determined volume of the fluid in a memory of the pharmaceutical compounding device. The process 3300 can include controlling the IR light source used to illuminate the object.

A sixth implementation, alone or in combination with one or more of the first through fifth implementations, process 3300 may include generating a notification for a user if the volume of the fluid is greater or less than a threshold amount of an expected volume of the fluid based on the workflow.

It should be noted that while FIG. 33 shows example blocks of process 3300, in some implementations, process 3300 may include additional blocks, fewer blocks, different blocks, or differently arranged blocks than those depicted in FIG. 33. Additionally, or alternatively, two or more of the blocks of process 3300 may be performed in parallel.

In other embodiments, when the pharmacist specifies a compounding protocol for which a batch was recently prepared, the system may automatically recognize that a supply of batch-prepared drug is on hand and may by default automatically intercept the assignment for filling from stock in the anteroom rather than sending the protocol to a compounding device for preparation. Preferably, the pharmacist can override this default if desired, and direct fresh compounding.

While the examples above have been given in the context of compounding of medications for intravenous (IV) delivery, the principals involved are applicable in other contexts as well. For example, in neonatal and pediatric care, medicines are often given to infants and children orally in liquid form. This may be true even for medications that might often be given to older patients in pill or other form, for example acetaminophen. Preparation of oral liquid medication doses may be considered a type of medication compounding, performed in accordance with a workflow. For example, a powdered medication may be dissolved into a liquid for oral delivery, or a concentrated liquid medication may be diluted to a particular dosage appropriate for the age or size of the patient.

Workflows and protocols can be created using the techniques described above for the preparation of medications for delivery as oral liquids. As with medications formulated and packaged for IV delivery, a medication may be prepared in liquid form for a specific patient, may be premade locally, or may be purchased premade from a supplier. In the case of premades, virtual protocols may be constructed as described above.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. It is to be understood that any workable combination of the elements and features disclosed herein is also considered to be disclosed.

The invention has now been described in detail for the purposes of clarity and understanding. However, those skilled in the art will appreciate that certain changes and modifications may be practiced within the scope of the appended claims.

What is claimed is:

1. A pharmaceutical compounding device, comprising:
- a processor;
- a visible light camera;
- an infrared camera;
- a transparent tray comprising a scale plate;
- an electronic display; and
- a memory storing instructions that, when executed by the processor, perform operations comprising:
  - capturing an image of an object placed on the scale plate using the visible light camera;
  - accessing a plurality of trained machine learning models stored in a memory of the pharmaceutical compounding device;
  - determining an identification of the object based at least in part on the image of the object using machine learning image analysis techniques using a trained model using at least a first one of the plurality of trained machine learning models;
  - determining, based at least in part on analysis of the image utilizing one or more of the trained machine learning models, a vessel type associated with the object;
  - determining, based at least in part on the analysis of the image utilizing the one or more of the trained machine learning models, a quantity of the object;
  - selecting, based at least in part on the vessel type and the quantity of the object, a workflow from multiple potential compounding workflows to compound a medication associated with the object;
  - upon determining the identification of the object and selection of the workflow, generating a set of steps of the workflow to compound the medication associated with the object; and
  - generating a notification on the electronic display based on the workflow.

2. The pharmaceutical compounding device of claim 1, further comprising at least one of:
- a printer configured to print labels, a visible light source configured to illuminate the object on the scale plate, a barcode scanner, adjustable leveling knobs configured to level the pharmaceutical compounding device, a network interface, or an infrared area light source positioned below the transparent tray and configured to illuminate the object through the transparent tray.

3. The pharmaceutical compounding device of claim 1, wherein the operations further comprise preprocessing the image of the object prior to determining an identification of the object.

4. The pharmaceutical compounding device of claim 3, wherein the preprocessing the image comprises cropping the image.

5. The pharmaceutical compounding device of claim 1, wherein the operations further comprise:

comparing the identification of the object to a plurality of consumable products expected for the workflow; and when there is a mismatch between the identification of the object and the expected consumable products, generate an alert to display on the electronic display.

6. The pharmaceutical compounding device of claim 1, wherein the operations further comprise:

generating a count for a consumable product based on the identification and on the image with a second one of the plurality of trained machine learning models; and storing the count in a memory of the pharmaceutical compounding device.

7. The pharmaceutical compounding device of claim 1, wherein the operations further comprise:

determining that the object is an intravenous fluid bag;

determining based at least in part on the image of the object using at least a third one of the plurality of trained machine learning models whether the object is within a field of view of the image;

when the captured image of the object is determined as being at least partially outside the field of view, generate an alert to reposition the intravenous fluid bag on the scale plate and capture a second image of the object; and when the captured image of the object is determined as being inside of the field of view, store the image and continue the workflow.

8. The pharmaceutical compounding device of claim 1, wherein the operations further comprise:

determining that the object is a syringe;

capturing a second image with of the object placed on the scale plate with an infrared camera;

detecting a presence of an air bubble inside a fluid within the syringe based at least in part on the second image and using a fourth one of the plurality machine learning models; and generating an alert that is displayed on the pharmaceutical compounding device when the presence of the air bubble is detected.

9. The pharmaceutical compounding device of claim 1, wherein the operations further comprise:

determining that the object is a syringe;

capturing a second image with of the object placed on the scale plate with an infrared camera;

determining a volume of a fluid inside the syringe based at least in part on the second image and using a fourth one of the plurality of machine learning models; and storing the determined volume of the fluid in a memory of the pharmaceutical compounding device.

10. The pharmaceutical compounding device of claim 9, wherein the operations further comprise generating a notification for a user if the volume of the fluid is greater or less than a threshold amount of an expected volume of the fluid based on the workflow.

11. The pharmaceutical compounding device of claim 1, further comprising a weight scale underneath the scale plate.

12. The pharmaceutical compounding device of claim 11, where a measurement of the weight scale is fed into the machine learning model.

13. A method performed by a pharmaceutical compounding device for verifying a compounding operation, the method comprising:

capturing an image of an object placed on a scale plate using a visible light camera;

accessing a plurality of trained machine learning models stored in a memory of the pharmaceutical compounding device;

determining an identification of the object based at least in part on the image of the object using machine learning techniques using at least a first one of the plurality of trained machine learning models;

determining, based at least in part on analysis of the image utilizing one or more of the trained machine learning models, a vessel type associated with the object;

determining, based at least in part on the analysis of the image utilizing the one or more of the trained machine learning models, a quantity of the object;

selecting, based at least in part on the vessel type and the quantity of the object, a workflow from multiple potential compounding workflows to compound a medication associated with the object;

upon determining the identification of the object and selection of the workflow, generating a set of steps of the workflow to compound the medication associated with the object; and generating a notification on an electronic display based on the workflow.

14. The method of claim 13, further comprising:

comparing the identification of the object to a plurality of consumable products expected for the workflow; and when there is a mismatch between the identification of the object and the expected consumable products, generate an alert to display on the electronic display.

15. The method of claim 13, further comprising:

generating a count for a consumable product based on the identification and on the image with a second one of the plurality of trained machine learning models;

storing the count in a memory of the pharmaceutical compounding device.

16. The method of claim 13, further comprising:

determining that the object is an intravenous fluid bag;

determining based at least in part on the image of the object using at least a third one of the plurality of trained machine learning models whether the object is within a field of view of the image;

when the captured image of the object is determined as being at least partially outside the field of view, generate an alert to reposition the intravenous fluid bag on the scale plate and capture a second image of the object;

when the captured image of the object is determined as being inside of the field of view, store the image and continue the workflow.

17. The method of claim 13, further comprising:

determining that the object is a syringe;

capturing a second image with of the object placed on the scale plate with an infrared camera;

detecting a presence of an air bubble inside a fluid within the syringe based at least in part on the second image and using a fourth one of the plurality machine learning models; and generating an alert that is displayed on the pharmaceutical compounding device when the presence of the air bubble is detected.

18. The method of claim 13, further comprising:
determining that the object is a syringe;
capturing a second image with of the object placed on the scale plate with an infrared camera;
determining a volume of a fluid inside the syringe based at least in part on the second image and using a fourth one of the plurality of machine learning models; and
storing the determined volume of the fluid in a memory of the pharmaceutical compounding device.

19. The method of claim 18, further comprising generating a notification for a user if the volume of the fluid is greater or less than a threshold amount of an expected volume of the fluid based on the workflow.

20. A non-transitory computer readable medium storing instructions that when executed by a processor of a pharmaceutical compounding device performs operations comprising:
capturing an image of an object placed on a scale plate using a visible light camera;
accessing a plurality of trained machine learning models stored in a memory of the pharmaceutical compounding device;

determining an identification of the object based at least in part on the image of the object using machine learning techniques using at least a first one of the plurality of trained machine learning models;
determining, based at least in part on analysis of the image utilizing one or more of the trained machine learning models, a vessel type associated with the object;
determining, based at least in part on the analysis of the image utilizing the one or more of the trained machine learning models, a quantity of the object;
selecting, based at least in part on the vessel type and the quantity of the object, a workflow from multiple potential compounding workflows to compound a medication associated with the object;
upon determining the identification of the object and selection of the workflow, generating a set of steps of the workflow to compound the medication associated with the object; and
generating a notification on an electronic display based on the workflow.

* * * * *